(12) United States Patent
Iino et al.

(10) Patent No.: US 6,243,610 B1
(45) Date of Patent: Jun. 5, 2001

(54) NETWORK CONTROL SYSTEM, PROCESS MANAGEMENT METHOD IN THIS SYSTEM, AND RECORDING MEDIUM ON WHICH A PROCESS MANAGEMENT PROGRAM IS RECORDED

(75) Inventors: Yutaka Iino; Kenji Mitsumoto; Yasuo Takagi, all of Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/136,427

(22) Filed: Aug. 20, 1998

(30) Foreign Application Priority Data

Aug. 20, 1997 (JP) .................................................. 9-223898

(51) Int. Cl.[7] .................................................. G05B 15/00
(52) U.S. Cl. .................................... 700/1; 700/1; 700/32; 700/121; 700/5; 700/60; 700/63; 702/182; 709/213; 709/103; 710/13; 710/129; 710/28
(58) Field of Search .................................. 700/1, 32, 121, 700/5, 60–63; 709/213, 103; 702/182; 711/148; 712/119, 186; 710/113, 129, 28; 717/1, 5, 6

(56) References Cited

U.S. PATENT DOCUMENTS

| | | | |
|---|---|---|---|
| 3,805,227 | * 4/1974 | Lester | 367/6 |
| 4,622,682 | * 11/1986 | Kumakura | 375/285 |
| 5,764,626 | * 6/1998 | VanDervort | 370/232 |
| 5,784,005 | * 7/1998 | Akutsu et al. | 340/905 |

* cited by examiner

Primary Examiner—Ayaz Sheikh
Assistant Examiner—Firmin Backer
(74) Attorney, Agent, or Firm—Oblon, Spivak, McClelland, Maier & Neustadt, P.C.

(57) ABSTRACT

In a controlled object, a process variable of a controlled object process is detected by a sensor and its detection time is measured by a timer. A process signal transmitting device transmits, as a process signal, the process variable and the detection time to a control apparatus. A control variable calculating device calculates a control variable based on the received process variable and a control reference value, and transmits a control signal including the control variable and the received process variable detection time to the controlled object. In the controlled object, a control signal receiving device calculates a transmission delay, that is, a difference between control signal reception time that is measured by the timer and the transmitted process variable detection time, corrects the control variable by processing it in accordance with the transmission delay, and drives an actuator by using the corrected control variable.

14 Claims, 13 Drawing Sheets

NETWORK CONTROL SYSTEM, PROCESS MANAGEMENT METHOD IN THIS SYSTEM, AND RECORDING MEDIUM ON WHICH A PROCESS MANAGEMENT PROGRAM IS RECORDED

BACKGROUND OF THE INVENTION

1. Field of the Invention

The present invention relates to a network control system for both an asynchronous network type control system and a synchronous network type control system. In particular, the invention relates to a control system in which in a case where a controlled object process and a control apparatus are connected to each other via an asynchronous network, the control apparatus performs a control by calculating control variables for the controlled object process on a real-time basis.

2. Description of the Related Art

In conventional control systems, it is necessary to design means for calculating an optimum value of a control variable in accordance with dynamic characteristics of a controlled object process and implement it in a control apparatus in advance, and to execute a series of processes such as observation of a process variable, control calculations, and output of a value of a manipulated variable (in this specification, "manipulated variable" is as same meaning as "control variables") on a real-time basis, that is, at constant intervals. Therefore, it is necessary to construct a special network system (synchronous network) in which real-time operation is taken into account.

On the other hand, to keep the communication line cost low, extra costs are needed for development and maintenance for that purpose. In particular, where a controlled object process and a manipulation station including a control apparatus need to be installed at respective places that are very distant from each other, it is necessary to use a dedicated line in which real-time operation is taken into consideration. This requires a high communication line cost.

If an asynchronous network that is low in communication line cost is used, because it is a public line, there occurs a transmission delay that varies depending on a network state; for example, a large transmission delay occurs during a congested time. As a result, a variable, useless time occurs in a one-circulation path of a process signal or a control signal starting from a controlled object, reaching a control apparatus, and returning to the controlled object. This causes a problem that the control performance and the stability are lowered.

SUMMARY OF THE INVENTION

An object of the present invention is to provide a network control system which, even with an network in which real-time operation is not taken into account, can improve the control performance and the stability by precisely controlling a variable, useless time by performing precise time management that involves process variable detection time and control signal reception time on the controlled object side.

Another object of the invention is to provide a network control system which can reduce a communication line cost by enabling use of public lines, the Internet, etc. by precisely managing a variable, useless time.

To attain the above objects, according to a first aspect of the invention, there is provided a network control system comprising a control apparatus comprising process signal receiving device for receiving a process signal that is transmitted from a controlled object and includes process variable detection time; control variable calculating device for calculating a control variable for a process in the controlled object based on the received process signal; and control signal transmitting device for transmitting a control signal including the calculated control variable and the received process variable detection time to the controlled object via a network; and the controlled object comprising: control signal receiving device for receiving the control signal that is transmitted from the control apparatus; driving device for driving the process in the controlled object based on the control variable included in the control signal; detecting device for detecting a process variable of the process thus driven; time measuring device for measuring detection time of the process variable and reception time of the control signal; and process signal transmitting device for transmitting a process signal including the detected process variable and the measured process variable detection time to the control apparatus via the network, wherein the control signal receiving device further calculates a transmission delay that is a difference between the control signal reception time and the process variable detection time that is included in the control signal, corrects the control variable by processing it in accordance with the transmission delay, and outputs a corrected control variable to the driving device.

According to a second aspect of the invention, in the network type control system according to the first aspect, the control variable calculating device sets a plurality of assumed transmission delays and calculates optimum control variables for the respective assumed transmission delays, the control signal transmitting device transmits the calculated control variables en bloc as the control signal, and the control signal receiving device selects one of the control variables included in the control signal corresponding to an assumed transmission delay that is closest to an actual transmission delay, and outputs the selected control variable to the driving device as the corrected control variable.

According to a third aspect of the invention, in the network type control system according to the first aspect, the control variable calculating device calculates an optimum control variable response locus for a predetermined period from a present time, the control signal transmitting device transmits the optimum control variable response locus in such a manner that it is included in the control signal, and the control signal receiving device stores the optimum control variable response locus included in the received control signal, and sequentially outputs, to the driving device, values of the optimum control variable response locus as the corrected control variables in accordance with time that is measured by the time measuring device until reception of a next control signal.

According to a fourth aspect of the invention, in the network type control system according to the third aspect, the process signal transmitting device combines a preceding control variable and preceding control signal reception time with the process variable and the process variable reception time to generate the process signal, and the control variable calculating device comprises a model holding section for holding a model of the controlled object process and a network model in which a transmission delay is assumed; a data buffer for storing process variable history data of past process variables and process variable detection time points up to immediately before a present time and control variable history data of past control variables and control signal reception time points up to a preceding cycle; a prediction calculation section for calculating a future process variable prediction response from the present time based on the models held by the model holding device and the process variable and control variable history data stored in the data buffer; and a control variable optimization section for determining a future optimum control variable response locus from the present time so that the process variable prediction response calculated by the prediction calculation section becomes as close to a preset target response locus as possible, and calculates, every time a new process signal is received, an optimum control variable response locus for a predetermined period from a present time by repeatedly performing calculations relating to the process.

According to a fifth aspect of the invention, in the network type control system according to the fourth aspect, a plurality of controlled objects are connected to the single control apparatus bidirectionally like a star connection via individual network; the control apparatus comprises process signal receiving device for receiving process signals from the controlled objects, control variable calculating device for calculating control signals for the respective controlled objects, and control signal transmitting device for transmitting the control signals to respective control signal receiving device provided in the controlled objects via the networks; the control signal calculating device comprises a prediction calculation section for calculating future process variable prediction responses from a present time based on models of respective processes in the controlled objects, mutual interference models each representing an influence of mutual interference between the processes, models of the networks in which a transmission delay is assumed, and history data of past values of a plurality of process variables and a plurality of control variables up to the present time, and a control variable optimization section for determining future optimum control variable response loci from the present time so that the process variable prediction responses become as close to respective specified target response loci as possible, and calculates, every time a new process signal is received, an optimum control variable response locus for a predetermined period from a present time by repeatedly performing calculations relating to the process; and the control signal calculating device further calculates, every time a new process signal of any of the process variables is received, optimum control variable response loci for the respective control variables for a predetermined period from a present time by performing calculations of the above functions, and causes the control signal transmitting device to transmit the optimum control variable response loci to the respective controlled objects.

According to a sixth aspect of the invention, in the network type control system according to the first or second aspect, the controlled object further comprises transmission delay estimating device for estimating an average or a probability distribution function of past transmission delays up to a present time by measuring and storing the process variable detection time and the control variable reception time, and outputting the average transmission delay or the probability distribution function to the control signal receiving device and the process signal transmitting device; the control signal receiving device processes the received control signal by using the average transmission delay or the probability distribution function; and the control variable calculating device calculates the control variable in accordance with the average transmission delay or the probability distribution function that is included in the transmitted process signal.

According to a seventh aspect of the invention, there is provided a process management method for managing various processes in a controlled object, comprising the steps of calculating a control variable for execution of one of the processes in the controlled object in accordance with a control reference value and an actual process variable that was detected previously in the controlled object; generating a control signal including the calculated control variable and process variable detection time that has been transmitted from the controlled object; transmitting the control signal to the controlled object via an network; measuring reception time of the control signal in the controlled object; calculating a transmission delay that is a difference between the control signal reception time and the process variable detection time; correcting the control variable included in the control signal in accordance with the calculated transmission delay; driving driver in accordance with the corrected control variable, to thereby execute the process; detecting a process variable of the process being executed and measuring detection time thereof; and generating a process signal including the detected process variable and the measured process variable detection time, and transmitting the process signal to the control apparatus via the network.

According to an eighth aspect of the invention, there is provided a recording medium on which a process management program for managing various processes in a controlled object of a network type control system is recorded, the process management program being for causing a computer to execute the steps of calculating a control variable for execution of one of the processes in the controlled object in accordance with a control reference value and an actual process variable that was detected previously in the controlled object; generating a control signal including the calculated control variable and process variable detection time that has been transmitted from the controlled object; transmitting the control signal to the controlled object via a network; measuring reception time of the control signal in the controlled object; calculating a transmission delay that is a difference between the control signal reception time and the process variable detection time; correcting the control variable included in the control signal in accordance with the calculated transmission delay; driving driver in accordance with the corrected control variable, to thereby execute the process; detecting a process variable of the process being executed and measuring detection time thereof; and generating a process signal including the detected process variable and the measured process variable detection time, and transmitting the process signal to the control apparatus via the network.

According to a ninth aspect of the invention, there is provided a network control system for transmitting signal between a control apparatus and a controlled object, comprising a process signal outputting device connected to said controlled object, for outputting an observed process variable and an output time information, a control signal outputting device connected to said control apparatus, for outputting control variable taken account of the observed process variable and the output time information, and a process signal inputting device connected to said controlled object, for calculating delay time of the output time information from said control signal outputting device to said process signal inputting device, and re-calculating the process variable taken account of the calculating delay time.

The control signal outputting device outputs a plurality of estimated control variables, and said process signal inputting device selects an optimum value from the estimated control variables by consideration of the delay time.

The control signal outputting device outputs a series of estimated control variables in time order, and said process signal inputting device utilizes the series of estimated control variables until when a new series of estimated control variables is inputted.

DETAILED DESCRIPTION OF THE PREFERRED EMBODIMENTS

The preferred embodiments of a network control system, a process management method, and a recording medium storing a process management program according to the present invention will be hereinafter described with reference to the accompanying drawings.

The embodiments as explained below are relates to an asynchronous, however, this invention can be adopted both a synchronous network system and an asynchronous network system.

Figure 1:
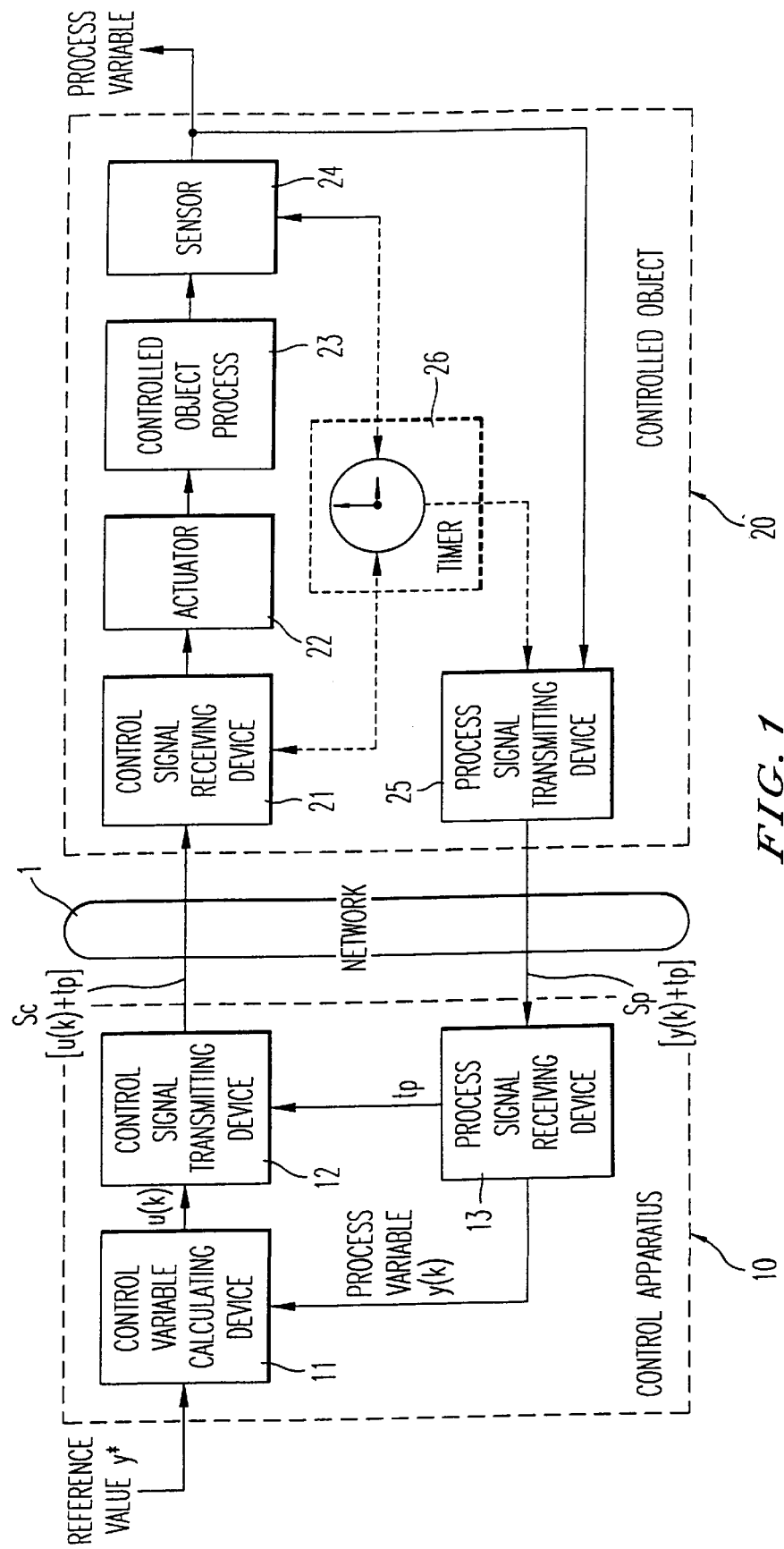
FIG. 1 is a block diagram showing the configuration of a network type control system according to a first embodiment of the present invention.

An asynchronous network type control system according to a first embodiment of the invention will be described below with reference to FIG. 1. FIG. 1 is a block diagram showing the basic configuration of the control system according to the first embodiment. In the control system of FIG. 1, a control apparatus 10 and a controlled object 20 are connected to each other via an asynchronous network 1 capable of two-way communication. The control apparatus 10 is provided with the following devices. A control variable calculating device 11 calculates, based on reference values, control variables for controlling various processes in the controlled object 20. A control signal transmitting (outputting) device 12 transmits, as a control signal, a calculated value of a control variable, to the controlled object 20 via. the network 1. A process signal receiving (inputting) device 13 receives a process signal from the controlled object 20.

The controlled object 20 is provided with the following components. A control signal receiving (inputting) device 21 receives a control signal that is transmitted from the control signal transmitting (outputting) device 12 of the control apparatus 10 via the network 1. An actuator 22 is driven in response to a received control signal. A controlled object process 23 executes a prescribed process by using drive force of the actuator 22. A sensor 24 as a detecting device detects a process variable of the process 23. A process signal transmitting (outputting) device 25 transmits, as a processing signal, a value of the process variable that has been detected by the sensor 24 to the control apparatus 10 via the network 1. A timer 26 as a time measuring device measures control signal reception time tc when the control signal receiving (inputting) device receives a control signal, process variable detection time tp when the sensor 24 detects the process variable, and process signal transmission time of the process signal transmitting device 25, and causes the process signal transmitting device 25 to transmit information of those time points in such a manner that it is included in the processing signal.

In the control apparatus 10, the control signal transmitting device 12 has a function of causing process variable detection time tp that has been transmitted from the controlled object 20 together with a process signal to be included, as it is, in a control signal. In the controlled object 20, the control signal receiving device 21 has a function of calculating a transmission delay Δ=tc−tp, that is, a difference between control signal reception time tc that is measured by the timer 26 and process variable detection time tp that is transmitted from together with a control signal, as well as a function of processing the control signal in accordance with the calculated transmission delay Δ and outputting a resulting signal to the actuator 22.

In the above control system according to the first embodiment, the process variable and the manipulated variable are not necessary of one channel. In the case of a multiple input/multiple output type controlled object process, there may occur multi-channel process variables or manipulated variables. In the first embodiment, as shown in FIG. 1, process variable detection time tp is measured by the timer 26 every time a latest process variable y(k) is detected by the sensor 24. The process signal transmitting device 25 transmits the process variable detection time tp in such a manner that it is included in a process signal Sp.

The control signal transmitting device 12 sends back, as it is, the process variable detection time tp that is included in the received process signal Sp to the controlled object 20 in such a manner that it is included in a control variable u (k). The control signal receiving device 21 causes the timer 26 to measure control signal reception time tc, and calculates a transmission delay Δ=tc−tp, that is, a difference between the control signal reception time tc and the process variable detection time tp that is included in the control signal Sc. Further, the control signal receiving device 21 processes the control variable u(k) included in the received control signal Sc in accordance with the calculated transmission delay Δ, and supplies a resulting value to the actuator 22. An example of processing on a control variable is as follows. Correction gains ki for several transmission delays Δi are stored in advance in the form of a numerical table:

$$\{\Delta 1, k1\}, \{\Delta 2, k2\}, \ldots, \{\Delta m, km\} \quad (1)$$

A control variable u(k) is multiplied by the correction gain ki corresponding to a transmission delay Δi that is closest to an actual transmission delay Δ:

$$u(k, \Delta) = u(k) \times ki \quad (2)$$

The control system according to the first embodiment has an advantage that an actual transmission delay Δ from process variable detection time tp to control signal reception time tc can be determined by using the timer 26 that is provided in the controlled object 20 immediately before a control variable u(k) is input to the controlled object process 23. Therefore, even when the load status of the network 1 has changed abruptly, the control signal input end section of the controlled object 20 can take a proper measure, whereby the performance, the stability, etc. of the control system can be kept in a normal state.

Figure 2:
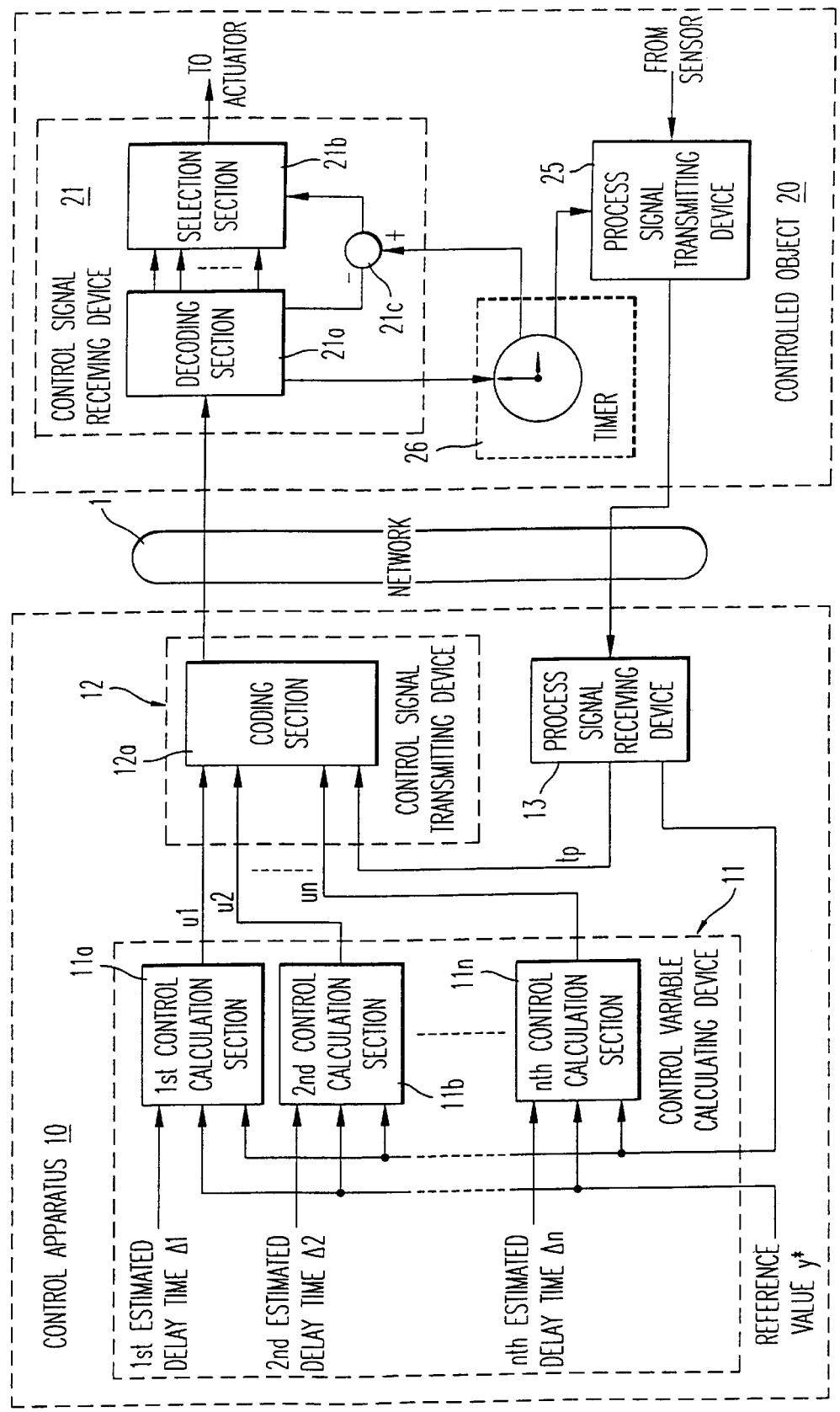
FIG. 2 is a block diagram showing the configuration of a network type control system according to a second embodiment of the invention.

Next, a second embodiment of an asynchronous network type control system according to the invention will be described with reference to FIG. 2. The control system of the second embodiment has the following functions in addition to the functions of the control system of the first embodiment. That is, as shown in FIG. 2, the control variable calculating device 11 has a function of assuming a plurality of (i.e., n) transmission delays Δ1–Δn and calculating optimum control variables ui (i=1, . . . , n) for the respective assumed transmission delays Δi (i=1, . . . , n). The control signal transmitting device 12 has a function of transmitting those control variables en bloc. In the controlled object 20, the control signal receiving device 21 has a function of selecting the control variable u corresponding to an assumed transmission delay that is closest to an actual transmission delay Δ=tc−tp from among the control variables ui (i=1, . . . , n) for the assumed transmission delays Δi (i=1, . . . , n) that are included in a control signal, and supplies it to the actuator.

A detailed configuration in the controlled object 20 for processing a control variable that is transmitted from the control apparatus 10 in accordance with a transmission delay Δ will be described below with reference to FIG. 2. As shown in FIG. 2, the control variable calculating device 11 has first to nth control calculation sections 11a–11n that assumes a plurality of, that is, first to nth, transmission delays Δ1–Δn in advance and calculate, every time, optimum control variables ui (i=1, . . . , n) for the respective assumed transmission delays Δi (i=1, . . . , n). The control signal transmitting device 12 has an encoder 12a that codes the control variables ui (i=1 . . . , n) and a process variable detection time tp. Resulting coded control variables are combined together and transmitted as a control signal together with the process variable detection time tp.

In the controlled object 20, a decoder 21a of the control signal receiving device 21 decodes, that is, reproduces, the control variables ui (i=1, . . . , n) and the process variable detection time tp. Then, as in the case of the first embodiment, in the control signal receiving device 21, a subtracter 21c calculates an actual transmission delay Δ=tc−tp. A selection section 21b selects the control variable u corresponding to an assumed transmission delay that is closest to the actual transmission delay Δ=tc−tp from among the control variables ui (i 1, . . . , n) for the assumed transmission delays Δi (i=1, . . . , n), and supplies it to the actuator (not shown).

The control system according to the second embodiment has a feature that it solves a problem that a final transmission delay of each time is not determined in a control apparatus that is located at a very distant place in such a manner that a plurality of transmission delays are calculated in advance and transmitted to the controlled object 20, and a most appropriate control variable is selected by the selection section 21b at a time point when a transmission delay is determined at the manipulation end of the controlled object 20. Therefore, the operation of the control system can be kept in a normal state even with an unstable network in which the transmission delay varies to a large extent every time.

In the control variable calculating device 11 performs optimum control calculations on the assumed transmission delays Δi according to a dynamic characteristic model in which the transmission delay is added to the controlled object process as a dead time element. The calculation method may be any control calculation method such as a PID (proportional, integral, differential) control calculation method, a Smith compensation control calculation method, a model prediction control calculation method, an optimum regulator control calculation method, or an H infinity optimum control calculation method.

Figure 3:
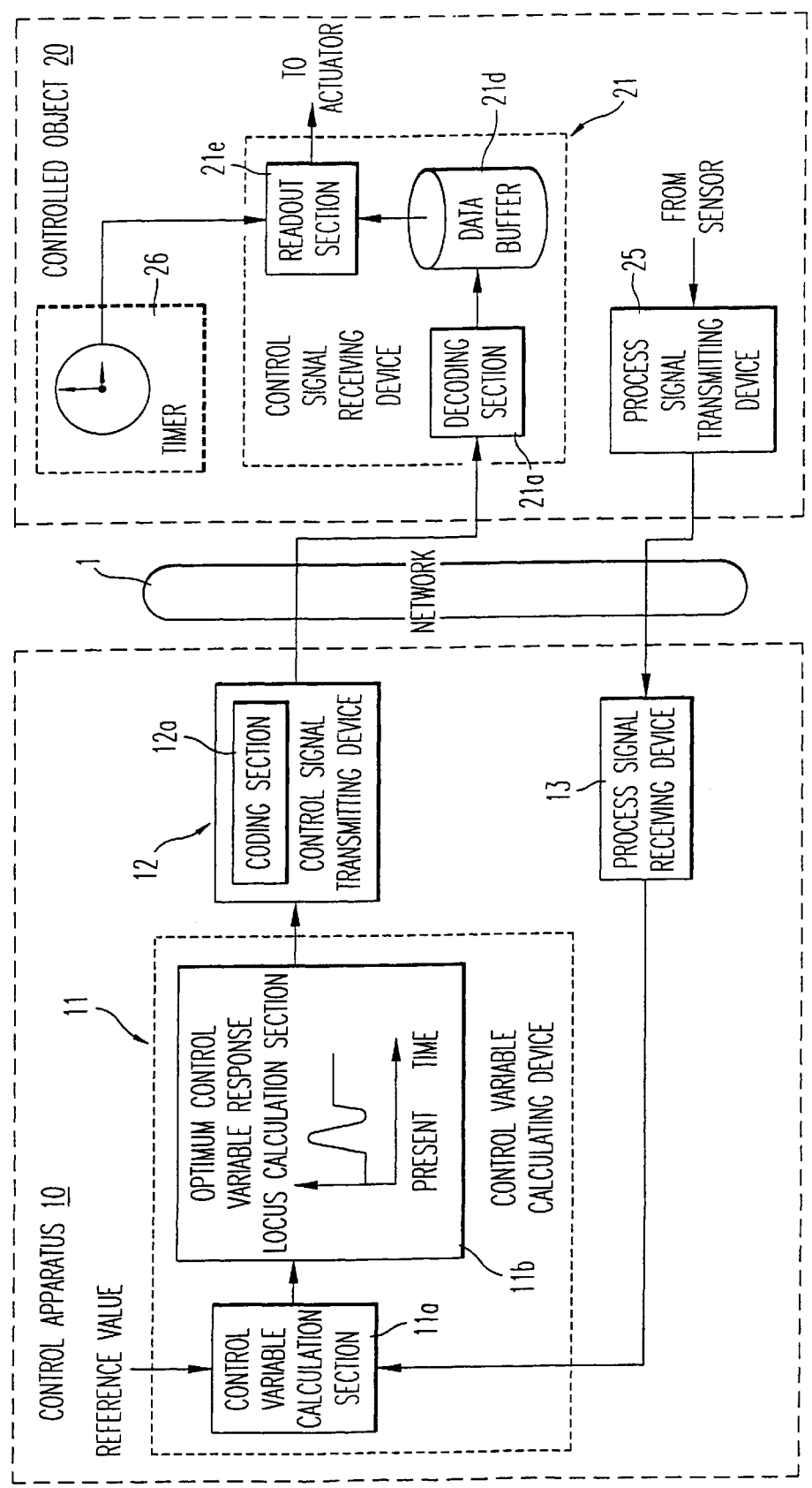
FIG. 3 is a block diagram showing the configuration of a network type control system according to a third embodiment of the invention.

Next, a control system according to a third embodiment of the invention will be described with reference to FIG. 3. The control system of the third embodiment has new components shown in FIG. 3 in addition to the configuration of control system of the first or second embodiment. As shown in FIG. 3, the control variable calculating device 11 has an optimum control variable response locus calculation section 11B that calculates an optimum control variable response locus up for a predetermined period from the present time based on a calculation output of a control variable calculation section 11A according to a calculation formula up=[u(0), u(1), . . . , u(Nu)]T. The control signal transmitting device 12 has a function of transmitting information of the optimum control variable response locus up in such a manner that it is included in a control signal.

In the controlled object 20, the control signal receiving device 21 is provided with the following sections. A decoder 21a decodes information of an optimum control variable response locus up that is included in a received control signal. A data buffer 21d stored a decoded optimum control variable response locus up. A readout section 21e sequentially supplies, as a control variable for the present time, a value on the optimum control variable response locus corresponding to time t that is measured by the timer 26 to the actuator (not shown) until reception of the next control signal. Since the other components are the same as the corresponding components of the control system of the first or second embodiments shown in FIGS. 1 or 2, they will not be described redundantly.

The control system according to the third embodiment is effective as another measure against a variation of the transmission delay in a network. In conventional control calculations, it is a general procedure that when a control variable u(k) is calculated at some time point, a control variable holding mechanism called a 0th-order holder, which is provided at the control signal input end of a controlled object, keeps the control variable at the constant value u(k) until the next control cycle. However, in this type of conventional control system, when the network load increases transiently and the transmission delay is thereby increased temporarily or when a network itself goes down temporarily, a control variable u(k) is continuously output for a long time. Such an operation of the control system is not necessarily proper.

In view of the above, in the control system according to the third embodiment, the optimum control variable response locus calculation section 11B of the control apparatus 10 calculates, at one time, an optimum control variable response locus up=[u(0), u(1), . . . , u(Nu)]T for a predetermined period from the present time in which the control variable converges to a constant value. The encoder 12a of the control signal transmitting device 12 codes the optimum control variable response locus and transmit it at one time in such a manner that it is included in a control signal. In the controlled object 20, the decoder 21a of the control signal receiving device 21 decodes the received control signal and thereby reproduces the optimum control variable response locus up, which is stored in the data buffer 21d. In the controlled object 20, until reception of the next control signal, the readout section 21e sequentially reads out, from the data buffer 21d, a value on the optimum control variable response locus up corresponding to time t that is measured by the timer 26, and sequentially outputs it, as a control variable for the present time, to the actuator (not shown).

According to the third embodiment, since the input end of the controlled object 20 is provided with the function of holding an optimum control variable response locus up=[u(0), u(1), . . . , u(Nu)]T instead of the conventional 0th-order holder function, control variables can be output continuously and independently at the manipulation end of the controlled object 20 even if the transmission delay increases temporarily and the control system can be kept in a state that is close to an optimum state as long as the controlled object process 23 is a stable system and a disturbance is small. Even at the occurrence of a worst accident such as a down of the network 1, the controlled object process 23 can be kept in a safe state until the network 1 recovers by continuously outputting control variables at the input end of the controlled object 20 and holding a final constant control variable. In the control variable calculating device 11, an optimum control variable response locus up=[u(0), u(1), . . . , u(Nu)]T can be calculated by a simulator for any control calculation method by providing the control apparatus 10 with the simulator that is a combination of a prediction model of the controlled object 20 and a control calculation formula. This corresponds to calculation of an open-loop optimum control variable for the controlled object 20.

The control system of the third embodiment can be implemented together with that of the second embodiment. That is, a plurality of transmission delays Δ1-Δn are assumed in advance and a plurality of optimum control variable response loci uip=[ui(0), ui(1), . . . , ui(Nu)]T (i=1, . . . , n) are calculated every time for the respective assumed transmission delays Δi (i=1, . . . , n). The encoder 12a of the control signal transmitting device 12 codes the optimum control variable response loci uip and process variable detection time tp and transmits those en bloc as a control signal. In the controlled object 20, the decoder 21a of the control signal receiving device 21 decodes the received control signal and thereby reproduces the optimum control variable response loci uip=[ui(0), ui(1), . . . , ui(Nu)]T (i=1, . . . , n) and the process variable detection time tp. A subtracter that is configured in the same manner as the subtracter 21c shown in FIG. 2 calculates an actual transmission delay Δtc−tp. A selection section that is configured in the same manner as the selection section 21b selects, from among the optimum control variable response loci uip for the respective assumed transmission delays Δi (i=1, . . . , n), an optimum control variable response locus up=[u(1), u(2), . . . , u(Nu)]T that corresponds to an assumed transmission delay that is closest to the actual transmission delay Δ=tc−tp, and stores it in the data buffer 21d. In the controlled object 20, until reception of the next control signal, the readout section 21e sequentially reads out, from the data buffer 21d, a value on the optimum control variable response locus up corresponding to time t that is measured by the timer 26, and sequentially outputs it, as a control variable for the present time, to the actuator (not shown). By combining the second and third embodiments in this manner, the reliability of the control system against a variation of the transmission delay can further be increased.

Figure 4:
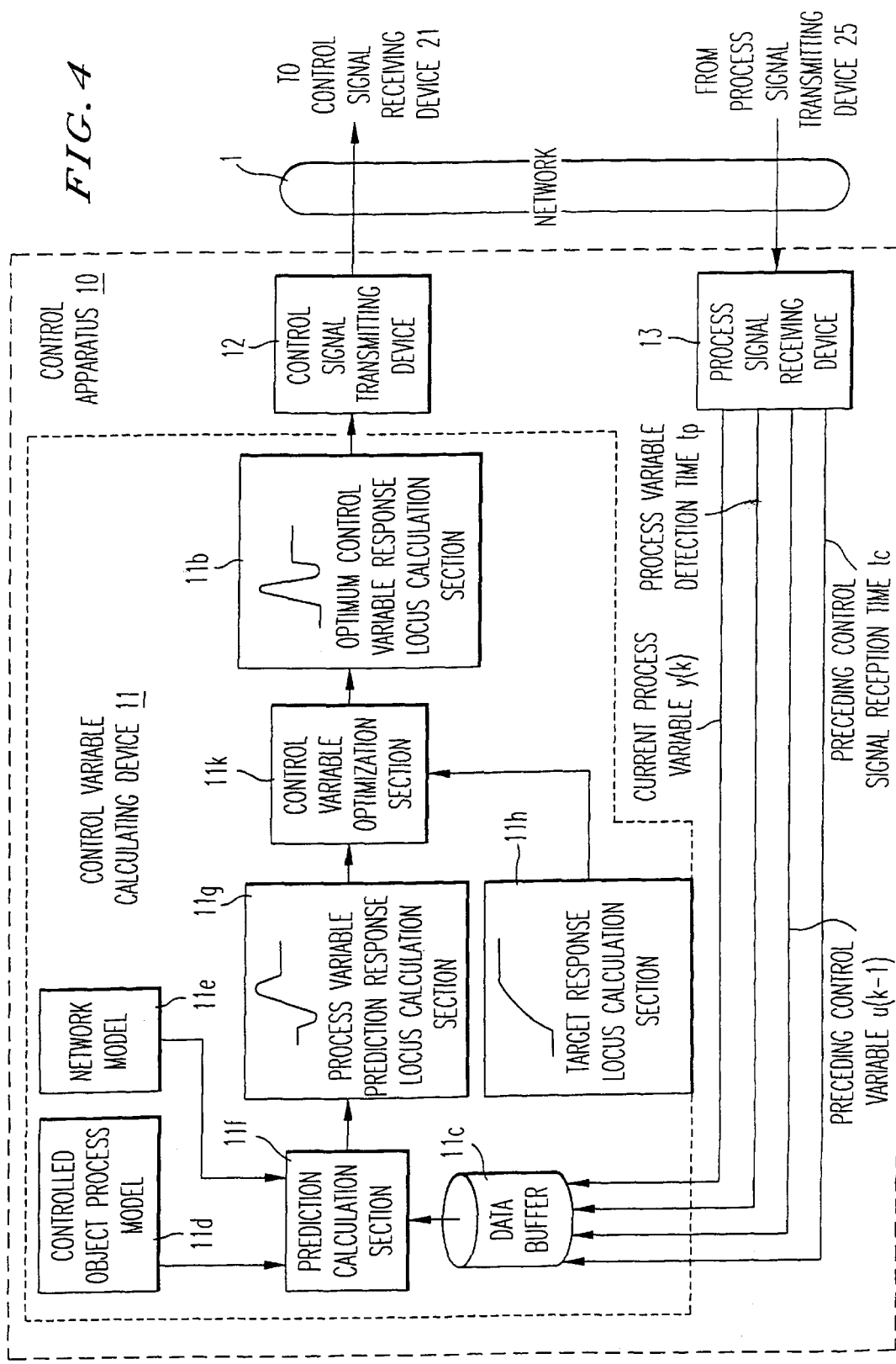
FIG. 4 is a block diagram showing the configuration of a control system according to a fourth embodiment of the invention which uses an optimum control variable response locus.

Next, a control system according to a fourth embodiment of the invention will be described with reference to FIG. 4. In the control system of the fourth embodiment, components shown in FIG. 4 are added, in the control apparatus 10, to the configuration of the third embodiment. As shown in FIG. 4, the process signal transmitting device 25 (not shown) has a function of transmitting, via the network 1, a process signal in which process variable detection time tp, a preceding control variable u(k−1), and control signal reception time tc are added to a current process variable y(k). In the control apparatus 10, the control variable calculating device 11 is provided with the following components. A data buffer 11C stores a current process variable y(k), history data at past process variable detection time points tp (until a time point immediately before the present time), a preceding control variable u(k−1), and history data at past control signal reception time points tc (until a time point immediately before the present time). Reference symbol 11D denotes a controlled object process model, and symbol 11E denotes a network model in which a transmission delay is assumed. A process variable prediction response locus calculation section 11G calculates a future process variable prediction response from the present time based on the models 11D and 11E and various data stored in the data buffer 11C according to a calculation formula yp=[y(0), y(1), . . . , y(Np)]T. A control variable optimization section 11K optimizes optimum control variables so as to make the above prediction response as close to a specified target response locus y*=[y*(0), y*(1), . . . , y*(Np)]T as possible. An optimum control variable response locus calculation section 11B calculates a future optimum control variable response locus up=[u(0), u(1), .., u(Nu)]T from the present time based on the optimized control variables. Every time the process signal receiving device 13 receives a new process signal, the control variable calculating device 11 performs the above control variable-related calculations to determine an optimum control variable response locus up for a predetermined period from the present time.

In the control system according to the fourth embodiment, an optimum control variable response locus up for a predetermined period from the present time is calculated according to the following procedure, for instance.

A controlled object process model is expressed by a discrete time transfer function and a network model is expressed by a dead time, and they are combined as follows.

$$y(k) = G(z^{-1})u(k) \qquad (3)$$

$$= \frac{b_1 z^{-1} + b_2 z^{-2} + \ldots b_m z^{-m}}{1 + a_1 z^{-1} + a_2 z^{-2} + \ldots a_n z^{-n}} z^{-d} u(k)$$

$$= -a_1 y(k-1) - \ldots - a_n y(k-n) + b_1 u(k-1-d) + \ldots + b_n u(k-m-d)$$

A step response {gi} of the transfer function of Equation (3) and a matrix G as its array are defined as follows.

$$y(k) = g_1 u(k-1) + g_2 u(k-2) + \ldots \quad (4)$$

$$g_N u(k-N) + \ldots + \begin{bmatrix} G = & g_1 & 0 & \ldots & 0 \\ & g_2 & g_1 & 0 & \ldots & 0 \\ & \ldots & & & \\ & g_{Np} & \ldots & & g_{Np-Nu+1} \end{bmatrix}$$

Figure 5:
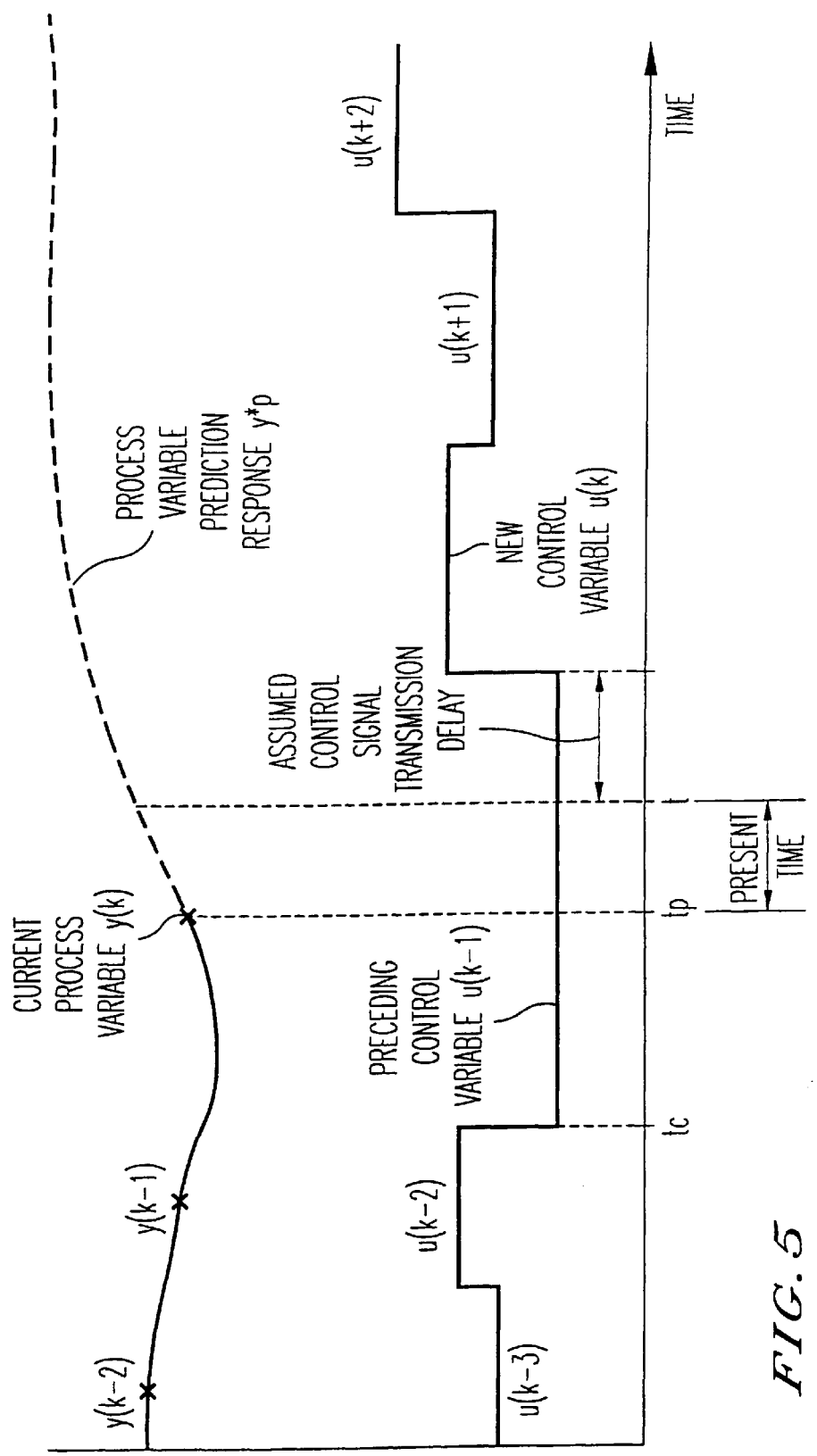
FIG. 5 is a graph showing a relationship between history data and prediction response loci of the process variable and the control variable.

First, a prediction calculation section 11F reads out history data of the process variable and the control variable, and plots those as history curves as shown in FIG. 5. Constant-period history data y(k−No), . . . , y(k) and u (k−No), . . . , u(k−1) are obtained by sampling those history curves at a constant period. A process variable prediction response yp=[y(0), y(1), . . . , y(Np)]T is calculated by sequentially substituting the sampled history data into the prediction formula (3). Then, the control variable optimization section 11K and the optimum control variable response locus calculation section 11B determines an optimum control variable response locus up based on a preset target response locus y*=[y*(0), y*(1), . . . , y*(Np)]T and the process variable prediction response yp by performing the following calculation.

$$\Delta up = [G^T G + \lambda I]^{-1} G^T (y^* - y_p) = [\Delta u(k), \Delta u(k-1), \ldots, \Delta u(k+Nu-1)]^T$$

$$u(k) = u(k-1) + \Delta u(k) u(k-1) = u(k) + \Delta u(k+1)$$

$$\ldots u(k+Nu-1) = u(k+Nu-2) + \Delta u(k+Nu-1) up = [u(k), u(k+1), \ldots, u(k+Nu-1)]^T$$

where I is an Nu×Nu unit matrix. This control calculation corresponds to an optimum control rule for minimizing an evaluation function:

$$J = \sum_{i=1}^{Np} (y^*(k+1) - y(k+1))^2 + \lambda \sum_{i=0}^{Nu-1} (u(k+1) - u(k+i-1))^2 \quad (6)$$

With the above configuration, an optimum control variable response locus can be determined, with a small amount of calculation, in consideration of the dynamic characteristics of the controlled object process and the transmission delay of the network 1. Therefore, the advantage of the control system according to the third embodiment can be maximized.

Next, a control system according to a fifth embodiment of the invention will be described. The fifth embodiment is featured by components provided in the controlled object 20 (see FIG. 6) in addition to the configuration of the first or second embodiment. That is, in the control system according to the fifth embodiment, process variable detection time tp and control signal reception time tc are measured and stored, and a past average transmission delay Δave (up to the present time) or a probability distribution function Φ(Δ) of the transmission delay is estimated. The estimated average transmission delay Δave or the probability distribution function Φ(Δ) of the transmission delay is used for processing a control variable in the control signal receiving device 21. Or it is transmitted to the control apparatus 10 from the process signal transmitting device 25, and control calculations are performed in the control variable calculating device 11 in accordance with the average transmission delay Δave or the probability distribution function Φ(Δ) of the transmission delay that is included in the received process signal.

Figure 6:
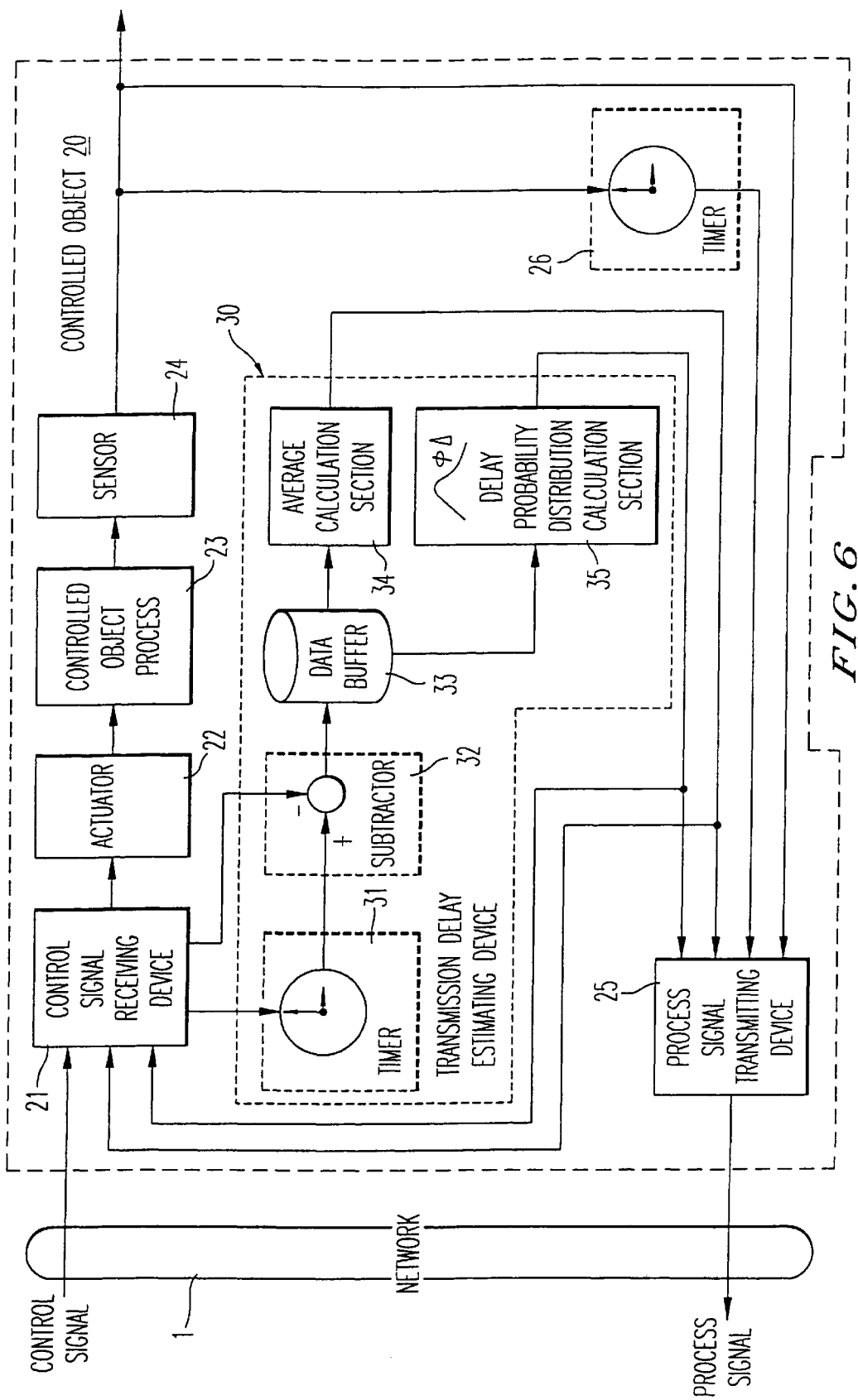
FIG. 6 is a block diagram showing the configuration of an asynchronous network type control system according to a fifth embodiment of the invention.

A specific configuration of the control system according to the fifth embodiment will be described below with reference to FIG. 6. As shown in FIG. 6, the controlled object 20 is provided with the following components. The control signal receiving device 21 receives a control signal that is transmitted from the control apparatus via the network 1. A transmission delay estimating device 30 estimates a transmission delay in accordance with process variable detection time tp that is included in a control signal transmitted from the control apparatus. The actuator 22 drives and controls the controlled object process 23 in accordance with an output of the control signal receiving device 21. The controlled object process 23 is driven by drive force of the actuator 22. The sensor 24 is an detecting device for detecting a process variable of the controlled object process 23. The timer 26 measures process variable detection time tp of the sensor 24. The process signal transmitting device 25 receives a process variable detected by the sensor 24, detection time tp measured by the timer 26, and an average transmission delay and a transmission delay probability distribution function that are outputs of the transmission delay estimating device 30, and transmits those to the control apparatus via the network 1.

The transmission delay estimating device 30 is provided with the following components. A timer 31 measures control signal reception time. A subtracter 32 subtracts process variable detection time tp from control signal reception time tc. A data buffer 33 stores an actual measurement value of a transmission delay that is an output of the subtracter 32. An average calculation section 34 calculates the average of past transmission delays (up to the present time). A delay probability distribution function calculation section 35 estimates a probability distribution function of past transmission delays (up to the present time).

The operation of the above-configured transmission delay estimating device 30 will be described below. Process variable detection time tp and control signal reception time tc are measured by the respective timers 26 and 31, and an average Δave or a probability distribution function Φ(Δ) of past transmission delays (up to the present time) is estimated. Actually, according to the same procedure as in the configuration of Fig. 2, the control signal receiving device 21 sends a trigger signal to the timer 31 at a time point when it receives a new control signal and the timer 31 measures control signal reception time tc. Preceding process variable detection time tp that is included in the control signal is decoded, and the subtracter 32 calculates a transmission delay Δ=tc−tp. The data buffer 33 sequentially stores M past transmission delays Δ(k−M), Δ(k−M+1), . . . , Δ(k−1) (up to the preceding cycle). The delay probability distribution calculation section 35 generates a histogram (frequency distribution graph) of those data while updating it, and outputs a result as an approximated transmission delay probability function Φ(Δ). The average calculation section 34 sequentially calculates and outputs an additive average Δave of the above transmission delay data as follows:

$$\Delta ave = \sum_{Mi=1}^{1M} \Delta(k-i) \quad (7)$$

A calculation result, that is, the average Δave or the probability distribution function Φ(Δ) of transmission delays, is supplied to the control signal receiving device 21, where it can be used for processing a control variable. Or the calculation result is supplied to the process signal transmitting device 25 of the control apparatus, and is transmitted to the control apparatus and used in the control variable calculation device 11. Specifically, in the case of the control system of the third embodiment, the range of assumed transmission delays Δ1, ..., ΔN are adjusted in accordance with the probability distribution function Φ(Δ). For example, the range is determined so as to cover 95% or more of the distribution of transmission delays Δ. In the case of the control system of the fourth embodiment, the probability distribution function Φ(Δ) is used so that the number d of dead time steps in the network model, that is, the prediction formula (3), reflects it.

As described above, by estimating a statistical parameter of the transmission delay while following, to some extent, its variation due to a load variation of the network 1 and using the statistical parameter in each control calculation, the corresponding control calculation device is allowed to operate properly.

Figure 7:
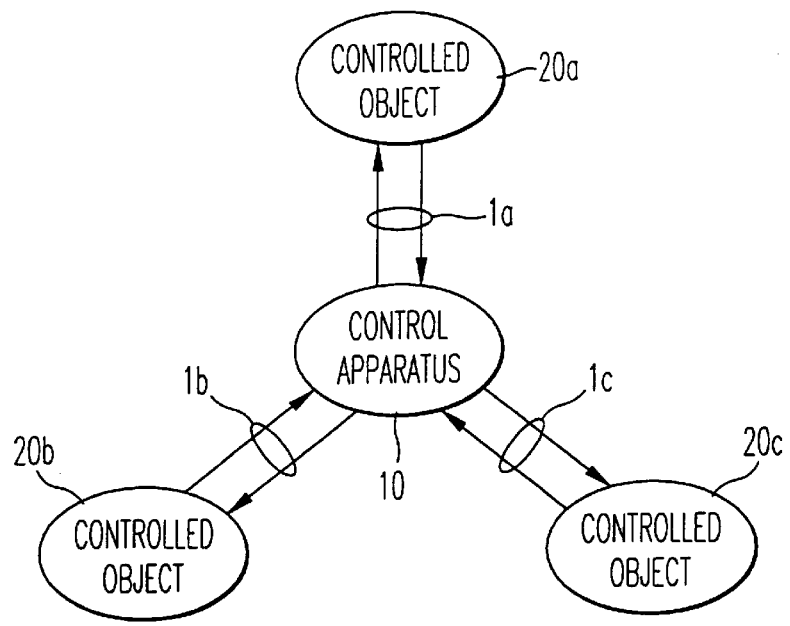
FIG. 7 is a block diagram showing the entire configuration of network control system including a plurality of controlled objects according to a sixth embodiment of the invention.

Next, a control system according to a sixth embodiment of the invention will be described with reference to FIGS. 7 and 8. As shown in FIG. 7, the sixth embodiment assumes a control system in which a plurality of controlled objects, for instance, first to third controlled objects 20A–20C and one control apparatus 10 are connected to each other bidirectionally like a star connection via networks 1A–1C. Specifically, as shown in FIG. 8, first to nth controlled objects 20A–20N are connected to the central control apparatus 10 via individual networks.

Figure 8:
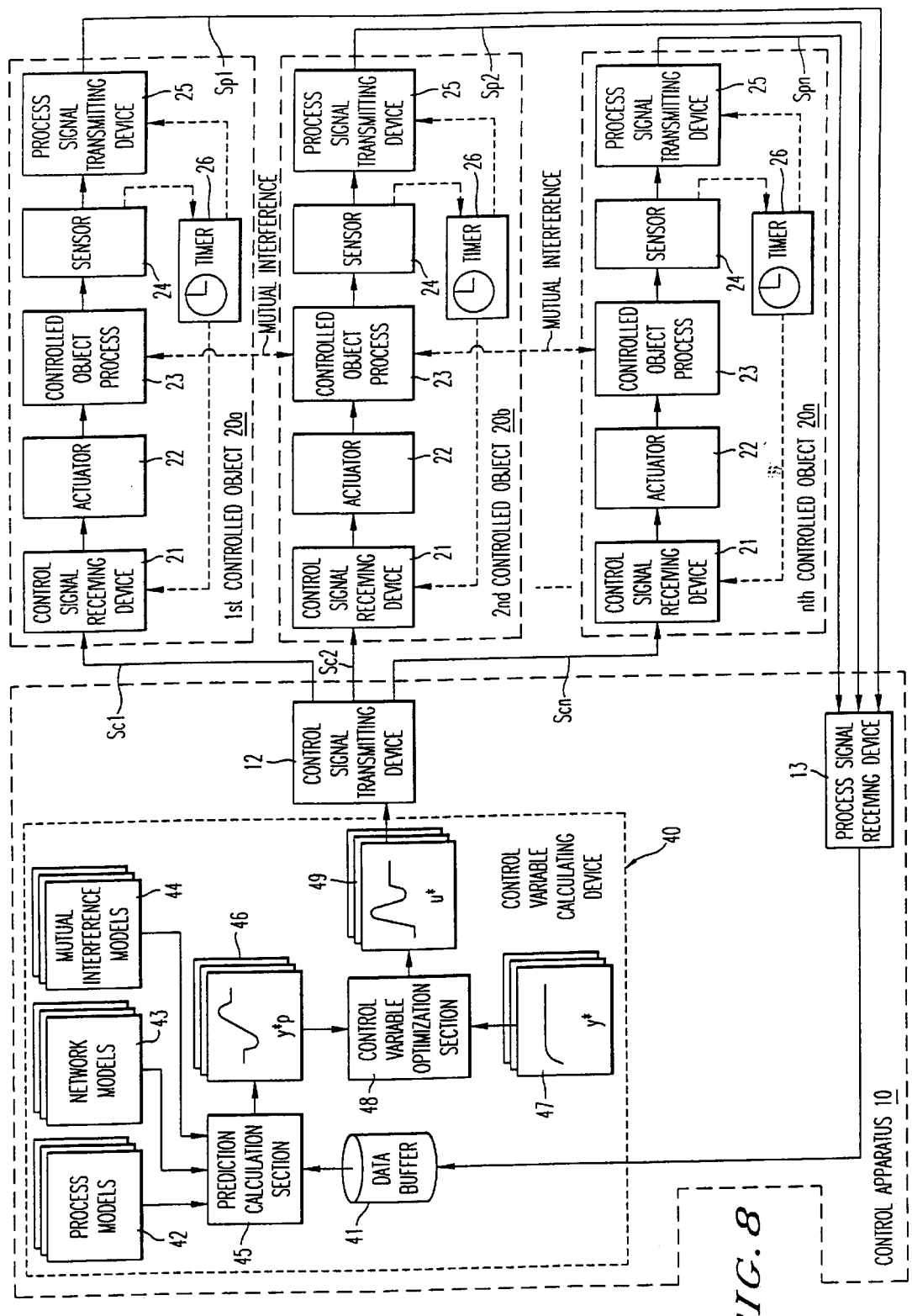
FIG. 8 is a block diagram showing a detailed configuration of the network type control system according to the sixth embodiment.

As shown in FIG. 8, the control apparatus 10 is provided with the following device. The process signal receiving device 13 receives a process signal that is transmitted from each controlled object via the associated network. A control variable calculating device 40 calculates a control variable for a controlled object process 23 in accordance with a reference value and a received process signal. The control signal transmitting device 12 transmits a control signal that includes a control variable that has been calculated by the control variable calculating device 40.

The control variable calculating device 40 is provided with the following components. A data buffer 41 stores various information that is included in process signals of respective controlled objects that are received via the process signal receiving device 13. Reference numerals 42–44 denote a controlled object process model storage section, a network model storage section, and a controlled object processes mutual interference model storage section, respectively. A prediction calculation section 45 performs prediction calculations based on various data, controlled object process models, network models, and controlled object processes mutual interference models, etc. that are stored in the data buffer 41 and the storage sections 42–44. A control variable optimization section 48 produces optimum control variable response loci (u*) 49 by optimizing control variables in accordance with process variable prediction response loci (y*p) 46 that are output from the prediction calculation section 45 and target response loci y* that are output from a storage section 47. The optimum control variable-response loci (u*) 49 that are output from the control variable optimization section 48 are transmitted, as control signals Sc1, Sc2, ..., Scn, by the control signal transmitting device 12 to the controlled objects 20A–20N via the networks, respectively.

Each of the first to nth controlled objects 20A–20N shown in FIG. 8 has the same configuration as the controlled object 20 of the control system of the first embodiment shown in FIG. 1, the components of each controlled object in FIG. 8 are given the same reference numerals as the corresponding components of the controlled object 20 in FIG. 1 and will not be described redundantly. However, the controlled objects 20A–20N are different from the controlled object 20 in that mutual interference exists between the controlled object processes 23.

With the above configuration, in addition to the components of the fourth embodiment, the control variable calculating device 40 has the prediction calculation section 45 which calculates future prediction responses of a plurality of process variables (from the present time) based on a plurality of controlled object process models, mutual interference models each representing influences of mutual interference between those processes, a plurality of network models in which the transmission delay is taken into account, a plurality of past process variables yi=[yi(k−No), yi(k−No+1), ..., yi(k)]T (up to the present time), and a plurality of past control variables ui=[ui(k−No), ui(k−No+1), ..., ui(k−1)]T (up to the present time; i=1, ..., n). The control variable calculating device 40 also has the control variable optimization section 48 which determines future optimum control variable response loci uip=[ui(0), ui(1), ..., ui(Nu)]T (from the present time; i=1, ..., n) so that process variable prediction responses yip=[yi(0), yi(1), ..., yi(Np)]T (i=1, ..., n) become as close to corresponding specified target response loci yi*=[yi*(0), yi*(1), ..., yi*(Np)]T (i=1, ..., n) as possible. Every time the process signal receiving device 13 receives a new process signal of one of the plurality of process variables, the control variable optimization section 48 performs the above control calculation, that is, calculates optimum control variable response loci uip=[ui(0), ui(1), ..., ui(Nu)]T (i=1, ..., n) for the respective controlled objects for a predetermined period from the present time, which are transmitted to the respective controlled objects from the control signal transmitting device 12.

The control system according to the sixth embodiment will be described below in more detail. The control variable calculating device 40 performs calculations according to the following procedure, for instance. In the following, for convenience of notation, the number of controlled objects is assumed to be p rather than n (the number is assumed to be n in the above description). A control variable and a process variable corresponding to each controlled object is represented by ui and yi, respectively. A controlled object process model is represented by a discrete time transfer function and a network model is represented by a dead time. They are combined as follows.

$$yi(k) = \sum_{j=1}^{p} G_{ij}(z^{-1}) u_j(k)$$

$$= \sum_{j=1}^{p} \frac{b_1^{ij} z^{-1} + b_2^{ij} z^{-2} + \ldots + b_{mij}^{ij} z^{-mij}}{a_1^{ij} z^{-1} + a_2^{ij} z^{-2} + \ldots + a_{mij}^{ij} z^{-nij}} z^{-dij} u_j(k)$$

where Gii(z−1) corresponds to a controlled object process model 42, the term z−dii in Gii(z−1) corresponds to a network model 43 in which the transmission delay is taken into account, and Gij(z−1), i≠j corresponds to a controlled object processes mutual interference model 44. A step response {giji} of the transfer function of Equation (8) and a matrix G as its array are defined as follows.

$$yi(k) = \sum_{j=1}^{p} g_{ij1} u_j(k-1) + g_{ij2} u_j(k-2) + \ldots g_{ijN} u_j(k-N) + \ldots \quad (9)$$

$$Gk = \begin{bmatrix} g^{11}k & \ldots & g^{1p}K \\ & \ldots & \\ g^{p1}k & \ldots & g^{pp}K \end{bmatrix}$$

-continued $$G = \begin{bmatrix} G_1 & 0 & \cdots & & 0 \\ G_2 & G_1 & 0 & \cdots & 0 \\ & & \cdots & & \\ G_{Np} & \cdots & & & G_{Np-Nu+1} \end{bmatrix}$$

First, the prediction calculation section 45 reads out history data of the process variable and the control variable, and plots those as history curves as shown in FIG. 5. Constant-period history data yi(k–No), . . . , yi(k), (i=1, . . . , p) and ui(k–No), . . . , ui(k-1), (i=1, . . . , p) are obtained by sampling those history curves at a constant period. A process variable prediction response vector $$yp=[y1(0), \ldots, yp(0), \ldots, y1(Np), \ldots, yp(Np)]^T \quad (10)$$

that is obtained by rearranging the elements of process variable prediction responses yip=[yi(0), yi(1), . . . , yi(Np)]T (i=1, . . . , p) is sequentially calculated by sequentially substituting the sampled history data into the prediction formula (8). Then, the control variable optimization section 48 prepares a target response locus vector $$y^*=[yi^*(0), \ldots, yp^*(1), \ldots, y1^*(NP), \ldots, yp^*(Np)]^T \quad (11)$$

that is obtained by rearranging the elements of target response loci yi*=[yi*(0), yi*(1), . . . , yi*(Np)]T (i=1, . . . , p) that are specified for the respective process variables. Then, the control variable optimization section 48 sequentially calculates optimum control variable response loci uip=[ui(0), ui(1), . . . , ui(Nu)]T (i=1, . . . , p) based on the process variable prediction response vector yp and the target response locus vector y* by performing the following calculation.

$$\Delta up=[G^T G+\lambda I]^{-1} G^T (y^*-y_p)=[\Delta u1(k), \ldots, \Delta up(k), \ldots, \Delta u1(k+Nu-1), \ldots, \Delta up(k+Nu-1)]^T$$

$$ui(k)=ui(k-1)+\Delta ui(k) \; ui(k+1)=ui(k)+\Delta ui(k+1) \ldots ui(k+Nu-1)=ui(k+Nu-2)+\Delta ui(k+Nu-1)$$

$$uip=[ui(k), ui(k+1), \ldots, ui(k+Nu-1)]^T (i=1, \ldots, p) \quad (12)$$

where I is an p·Nu×p·Nu unit matrix. This control calculation corresponds to an optimum control rule for minimizing an evaluation function:

$$J = \sum_{j=1}^{p} \sum_{i=1}^{Np} (yj^*(k+i) - yj(k+i))^2 + \lambda \sum_{j=1}^{p} \sum_{i=0}^{Nu-1} (uj(k+i) - uj(k+i-1))^2 \quad (13)$$

According to the first to sixth embodiments described above, an optimum network type control system can be constructed in consideration of controlled object processes, mutual interference therebetween, and dynamic characteristics of a network even in a case where a plurality of controlled objects or their input ends or process variable observation ends are distributed at distant places and have mutual interference as in the case of an electric power system, water/gas supply piping network, or the like. The control systems according to the first to sixth embodiments can be combined into a composite control system.

Next, a process management method in an asynchronous network type control system according to a seventh embodiment of the invention will be described with reference to FIG. 9. The process management method according to the seventh embodiment is to manage various processes in a controlled object in such a manner that a control signal that is transmitted from a control apparatus via an asynchronous network is received by the controlled object, one of various processes in the controlled object is driven in accordance with the control signal, a process variable of the process is detected and a process signal is transmitted to the control apparatus via the asynchronous network, and a control variable is calculated based on the process signal received by the control apparatus.

Figure 9A:
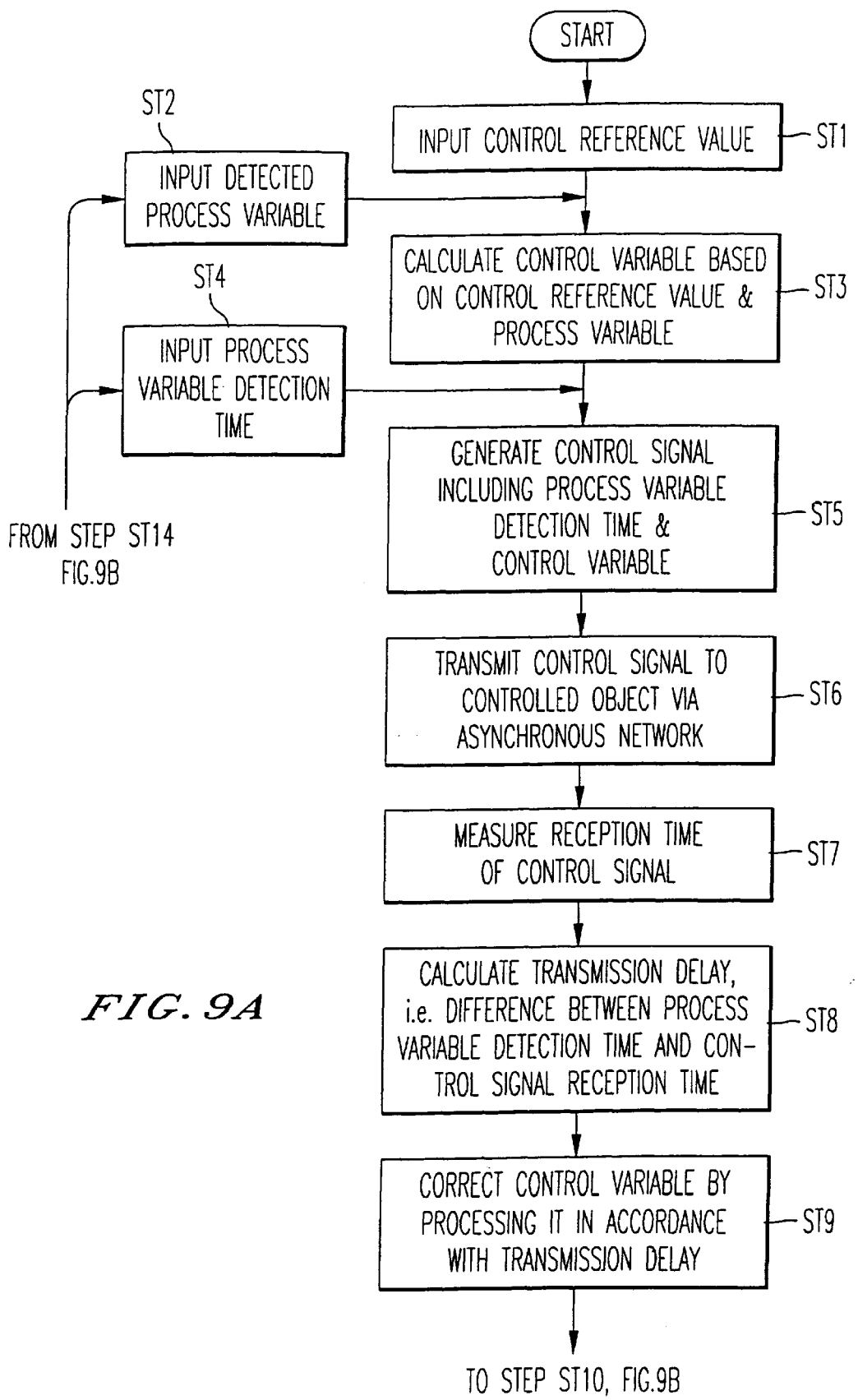
FIGS. 9A, 9B are flowcharts showing a process management method in an network type control system according to a seventh embodiment of the invention.
Figure 9B:
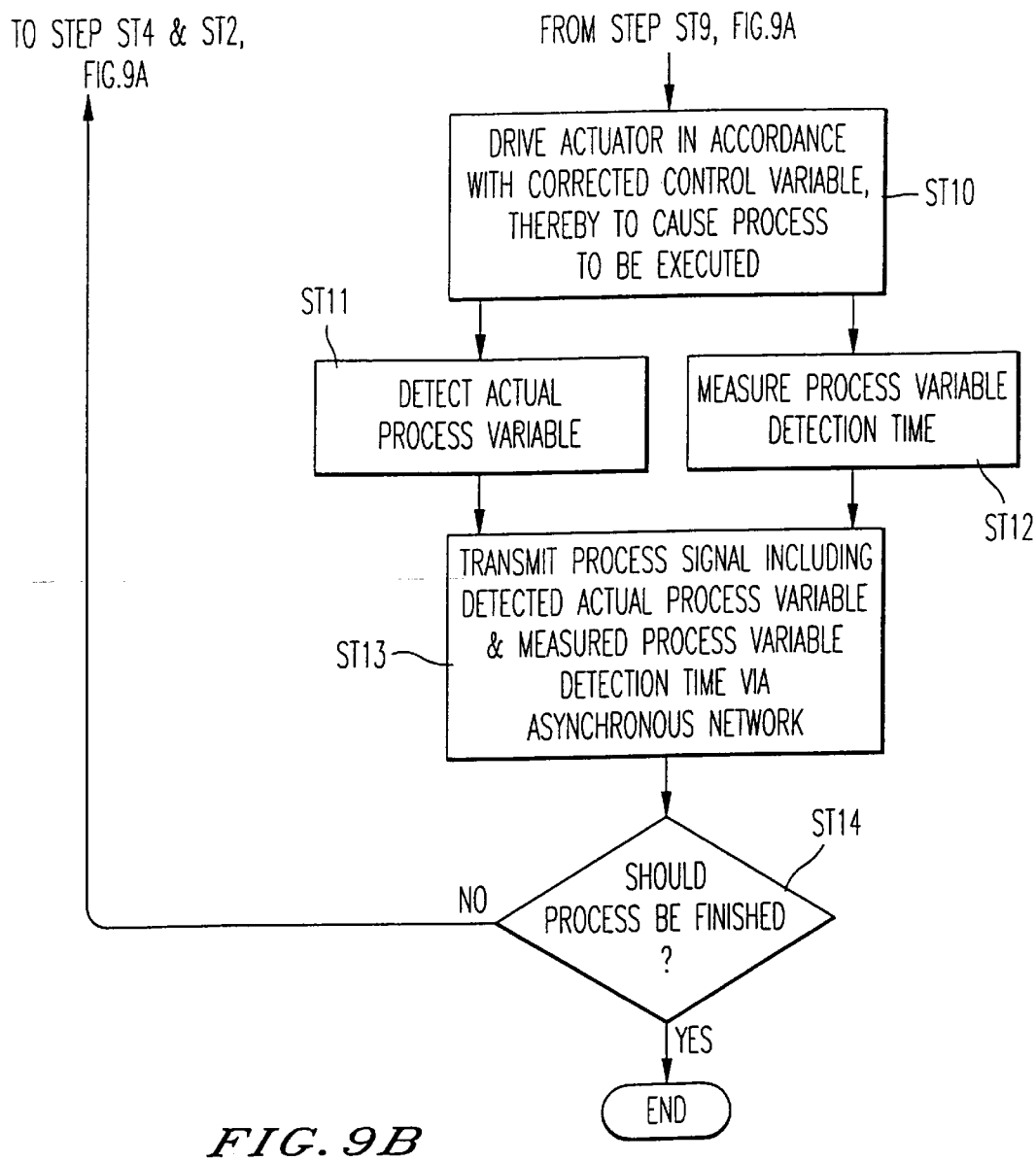

As shown in FIGS. 9A, 9B, in the process management method according to the seventh embodiment, a control variable for a certain process is calculated at step ST3 based on a control reference value that has been input at step ST1 and an actual, detected process variable that has been input at step ST2. At this time, there is no actual process variable is input in a case where the process is activated as in the case of a process management method according to an eighth embodiment described later. Therefore, the control reference value is output as a control variable for executing the process in the controlled object.

At step ST5, a control signal in which process variable detection time that has been input at step ST4 is added to the calculated control value is generated. Also at this time, since there is no actual process variable is input in a case where the process is activated, a control signal to which no process variable detection time is added is generated. At step ST6, the control signal is transmitted from the control apparatus to the controlled object via the asynchronous network. In the controlled object, the control signal that has been transmitted via the asynchronous network is received and reception time of the control signal is measured at step ST7.

In the controlled object, at step ST8, a transmission delay, that is, a difference between the measured control signal reception time and the process variable detection time that has been transmitted together with the control signal. At step ST9, the control variable included in the control signal is corrected by processing it in accordance with the calculated transmission delay. The corrected control variable is supplied to an actuator as driving device. At step ST10, the actuator adjusts a drive variable in accordance with the corrected control variable and causes the process to be executed. A process variable of the process being executed is detected at step ST11 and its detection time is measured at step ST12.

At step ST13, the process variable detected at step ST11 and the process variable detection time measured at step ST12 are combined into a process signal, which is transmitted from the controlled object to the control apparatus. Finally, whether to finish the process is judged at step ST14. If the process should be finished, the execution of the process management routine is finished. If the process should be continued, the routine of step ST3 onward is executed in a loop-like manner while a process variable is. detected every predetermined interval and its detection time is measured.

The process management method according to the seventh embodiment corresponds to the asynchronous network type control system according to the first embodiment. Process management methods corresponding to the control systems according to the second to sixth embodiments may be provided by modifying the process management method according to the seventh embodiment. As mentioned in the seventh embodiment, a routine for a case where a process is activated may be somewhat different from that for a case where an already activated process is continued.

Figure 10A:
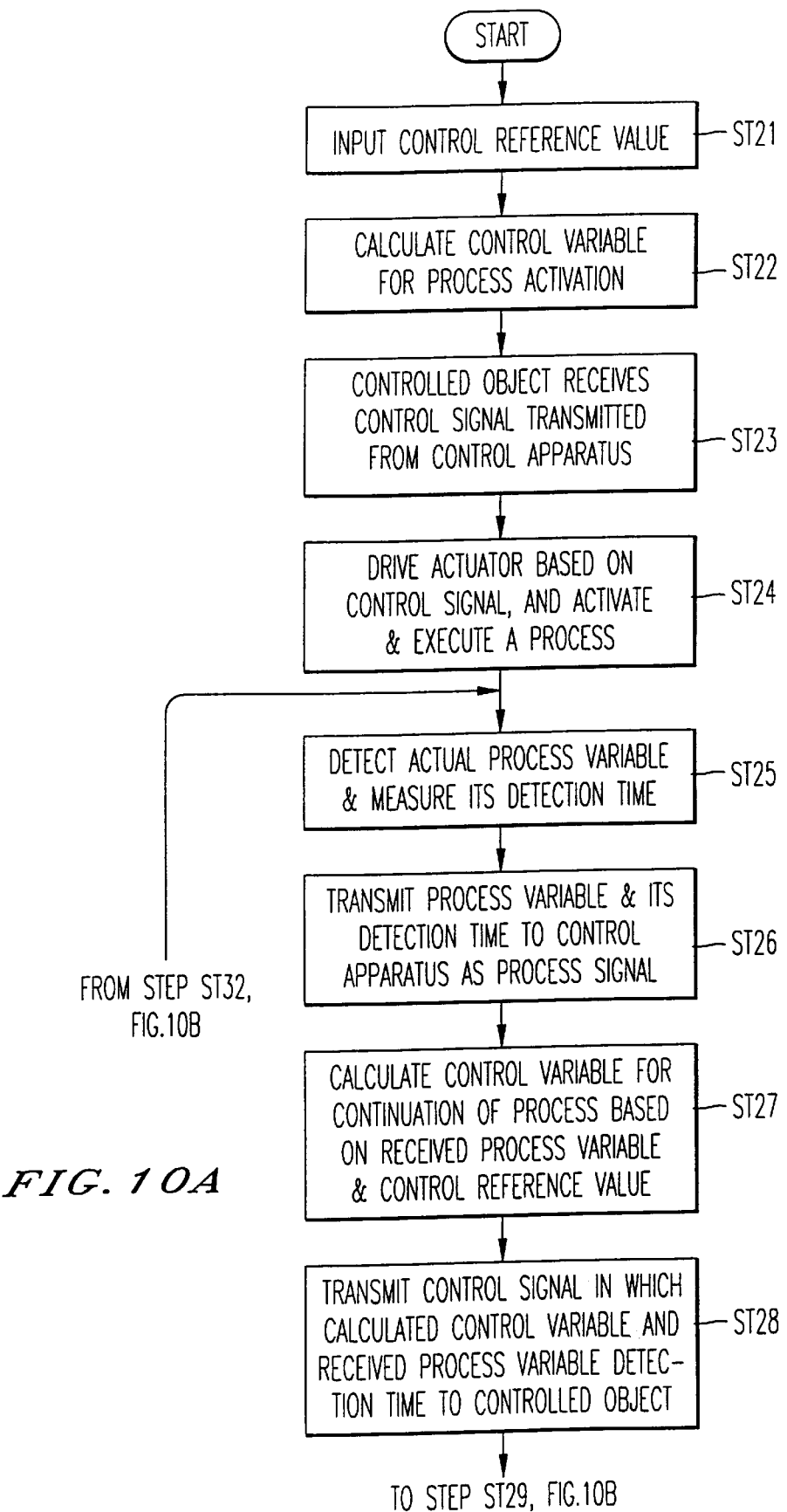
FIGS. 10A, 10B are flowcharts showing a process management method in a network type control system according to an eighth embodiment of the invention.
Figure 10B:
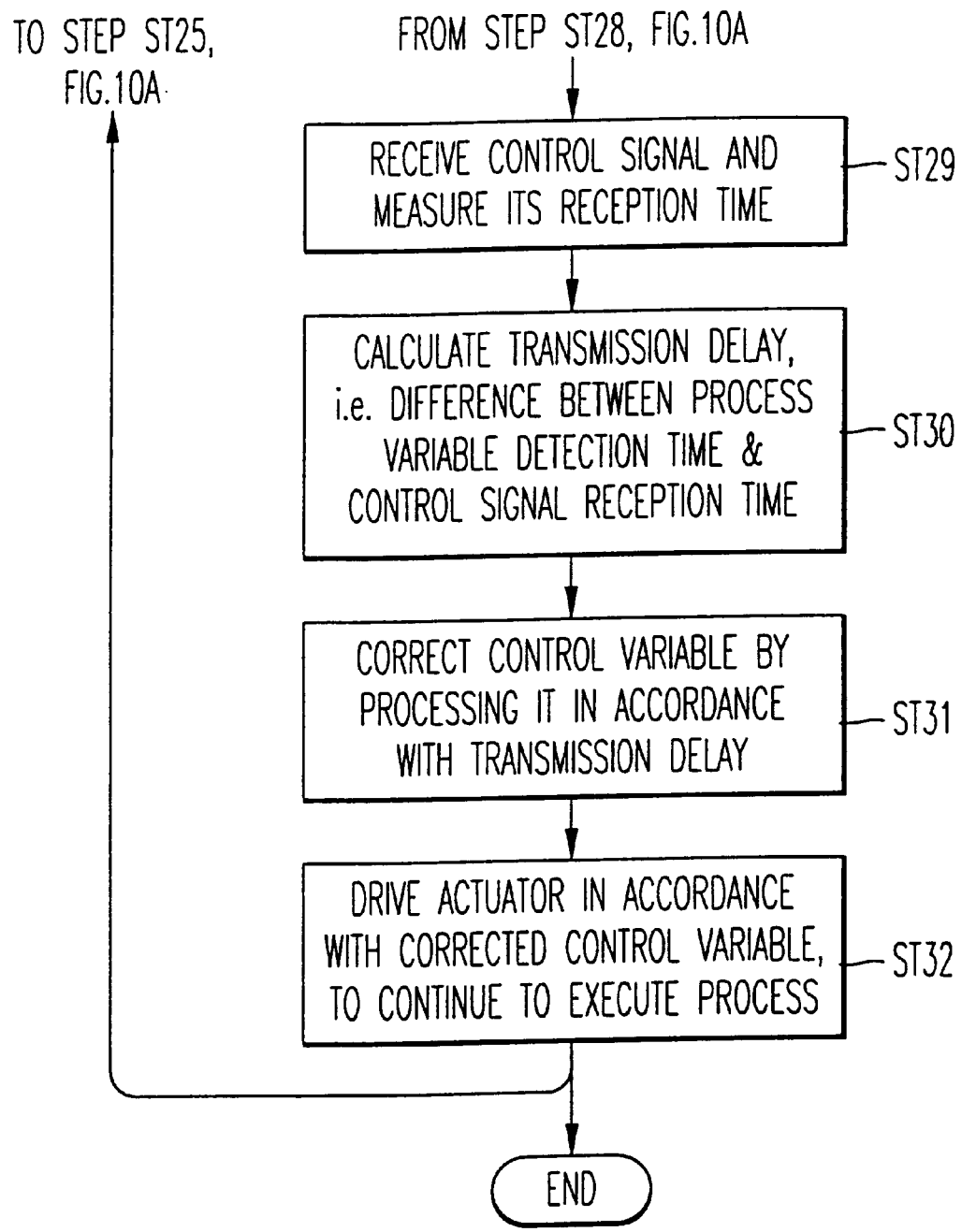

FIGS. 10A, 10B are a flowchart showing a process management method in an asynchronous network type control system according to an eighth embodiment in which a portion for a case of activating a process and a portion for a case of continuing to execute a process are separated from each other. As shown in FIG. 10, in the process management method of the eighth embodiment, at step ST22, a control variable for activating a process in the controlled object is calculated in the control apparatus based on a control reference value that has been input at step ST21. A control signal including the calculated control variable is transmitted from the control apparatus to the controlled object via the asynchronous network. At step ST23, the control signal transmitted from the control apparatus is received by the controlled object. At step ST24, an actuator is driven based on the control variable that is included in the control signal and a certain process is activated and executed.

At step ST25, a process variable of the executed process is detected by a sensor as a detecting device and its detection time is measured by a timer as a time measuring device. At step ST26, the detected process variable and its detection time are combined into a process signal by a process signal transmitting device, and the process signal is transmitted from the controlled object to the control apparatus via the asynchronous network. At step ST27, the process signal received by the control apparatus is divided into the process variable and the process variable detection time, and a control variable for continuing the process is calculated in accordance with the received process variable and the control reference value. At step ST28, the process variable detection time that has been separated from the process signal is combined with the calculated control variable to form a control signal, which is transmitted from the control apparatus to the controlled object via the asynchronous network.

In the controlled object, the control signal is received at step ST29 as in the case of step ST23. However, at step ST29, reception time of the control signal is measured as an additional operation. At step ST30, a transmission delay, that is, a difference between the measured control signal reception time and the process variable detection time that has been returned to the controlled object via the asynchronous network, the control apparatus, and the asynchronous network, being carried by the process signal and the control signal. At step ST31, in the controlled object, a corrected control variable is generated by processing the control variable that has been transmitted from the control apparatus being carried by the control signal in accordance with the calculated transmission delay. At step ST32, the actuator as a driving device is driven in accordance with the corrected control variable and the process continues to be executed.

In the process management method according to the eighth embodiment, after the series of steps has been executed continuously, the routine of steps ST25–ST32 is repeated while a process variable is detected by the detecting device such as a sensor every predetermined interval or every time the process variable goes out of a predetermined variation range and process variable detection time is measured by the time measuring device such as a timer. When a control signal to the effect that the process should be finished, the execution of the process management routine is finished.

Figure 11:
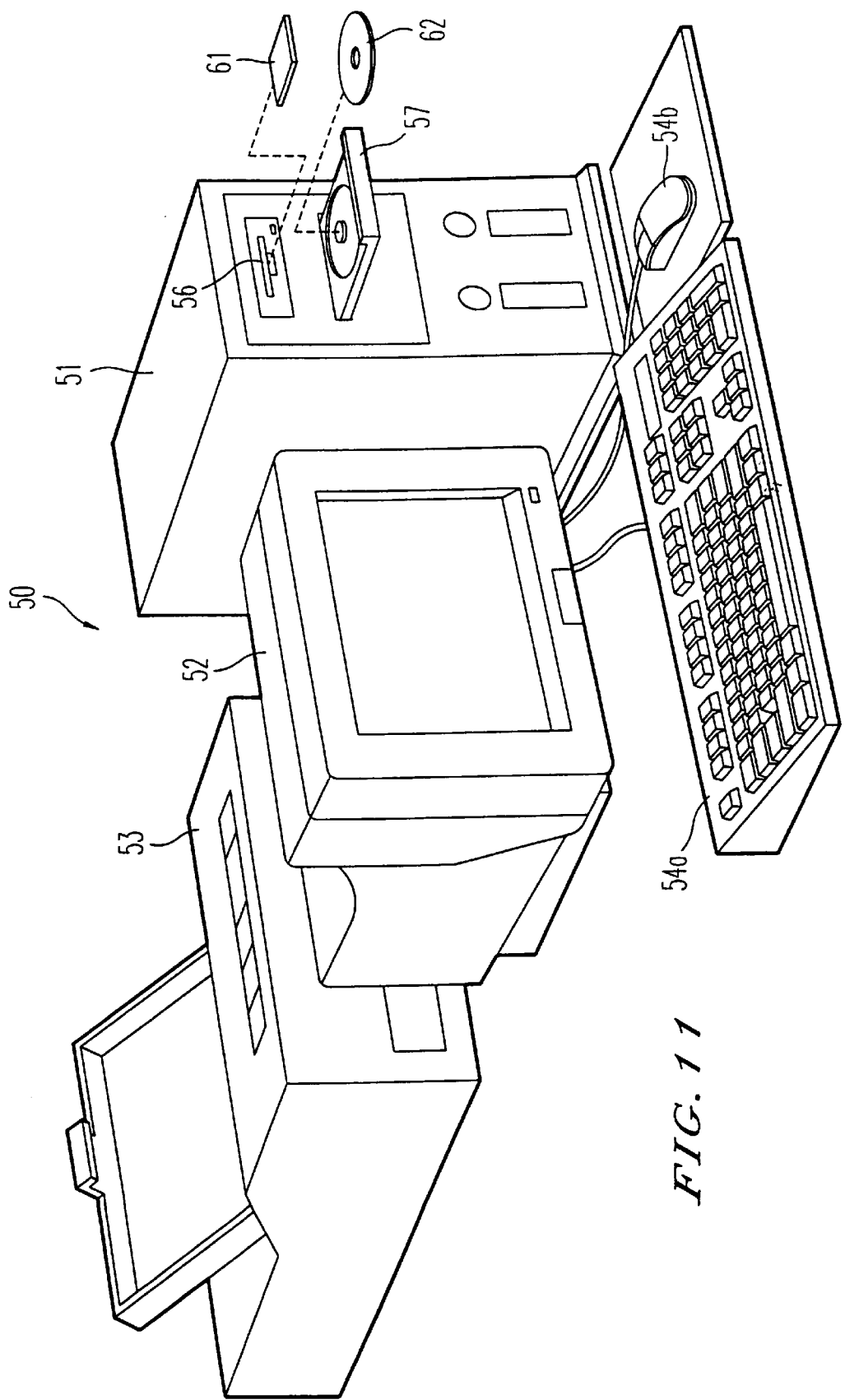
FIG. 11 is a perspective view of a computer system for reading out a process management program from a recording medium according to a ninth embodiment.

Finally, a recording medium according to a ninth embodiment on which a process management program in an asynchronous network type control system is recorded will be described with reference to FIGS. 11 and 12. A recording medium according to the ninth embodiment on which a process management program is recorded is read out by a recording medium driving device that is provided in a computer system as shown in FIG. 11 and used for process management in a control system. As shown in FIG. 11, the computer system 50 has a computer main body 51 that is accommodated in a chassis such as a mini-tower, a display device 52 such as a CRT (cathode-ray tube), a plasma display, or a LCD (liquid crystal display), a printer 53 as a record output device, a keyboard 54a and a mouse 54b as input devices, a floppy disk drive 56, and a CD-ROM drive 57.

Figure 12:
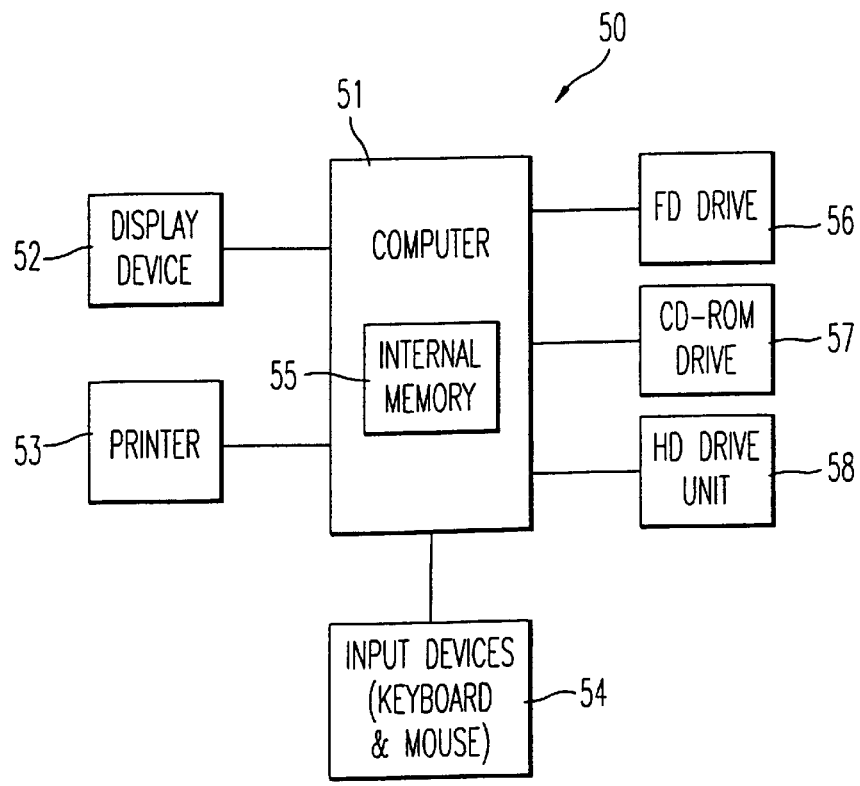
FIG. 12 is a block diagram of the computer system of FIG. 11.

FIG. 12 is a block diagram showing the above configuration. In addition to the computer main body 51, the chassis accommodates an internal memory 55 such as a RAM (random access memory) and an external memory such as a hard disk drive unit 58. As shown in FIG. 11, a process management program that is recorded on a floppy disk 61 according to the ninth embodiment can be read out by using a proper application program in a state that the floppy disk 61 is inserted in a slot. The recording medium on which a program is recorded is not limited to the floppy disk 61 and maybe a CD-ROM (read-only memory) 62. Other examples of the recording medium are MO (magneto-optical disc), an optical disc, and a DVD (digital versatile disc), all of which are not shown in FIG. 11.

A process management program that is recorded on the recording medium according to the ninth embodiment and can be read out by a computer or the like is one obtained by writing, for instance, the steps of FIG. 9 or 10 in a computer program format. Only a procedure of a process management program will be described below without using any redundant illustration.

The recording medium according to the ninth embodiment on which a process management program is recorded is used to manage various processes in a controlled object in such a manner that a control signal transmitted from a control apparatus via an asynchronous network is received by the controlled object, one of the processes in the controlled object is driven in accordance with the received control signal, a process variable is detected and transmitted, as a process signal, to the control apparatus via the asynchronous network, and the control apparatus calculates a control variable based on the received process signal. The program includes a step of calculating a control variable for execution of a certain process in the controlled object in accordance with a control reference value and an actual process variable that was detected previously in the controlled object, a step of generating a control signal including the calculated control variable and process variable detection time that has been transmitted from the controlled object, a step of transmitting the control signal to the controlled object via the asynchronous network, a step of measuring reception time of the control signal in the controlled object, a step of calculating a transmission delay, that is, a difference between the control signal reception time and the process variable detection time, a step of correcting the control variable included in the control signal in accordance with the calculated transmission delay, a step of driving a driving device in accordance with the corrected control variable, to thereby execute the process, a step of detecting a process variable of the process being executed and measuring its detection time, and a step of generating a process signal including the detected process variable and the measured process variable detection time and transmitting it to the control apparatus. This program is executed by the computer, whereby the processes in the controlled object of the asynchronous network type control system are managed.

The recording medium on which the program including the above steps is inserted into a disk slot of a floppy disk drive, a CD-ROM drive, a DVD-ROM drive, or the like, and the program is installed in the computer main body 51 according to a predetermined procedure. The program installed in the computer main body 51 causes the display device 52 to perform a display relating to the process management procedure in response to a prescribed manipulation of an operator or the like. The operator performs an interactive input operation by using the input devices such as the keyboard 54*a* and the mouse 54*b*. The process management is performed in this manner.

Each aspect of the invention has an advantage that the operation of the control system can be kept in a normal state even with a large, irregular variation of the transmission delay by correctly detecting a value of the network transmission delay that varies randomly immediately before a control variable is input to a controlled object process and then processing the control variable properly.

Even if a communication is temporarily suspended due to an abrupt variation of the network load, the control variable receiving function continues to output, each time, an optimum control variable response locus that is determined based on information that has been received so far. Therefore, a process variable can be controlled in a manner that is close to an optimum control. This makes it possible to provide a control system that is highly reliable against an abrupt or temporary accident in a network.

By estimating the average of transmission delays or their probability distribution that depend on load statuses of a network at respective time points and using it for control calculations or processing on a control variable, the operation of the device concerned can be kept proper.

Further, a network type control system according to the invention can still be constructed for a case where a plurality of controlled objects or their control input ends or process variable observation ends are distributed at distant places and have mutual interference as in the case of an electric power system, water/gas supply piping network, or the like.

The above advantages lead to the following advantages:

(1) Use of an inexpensive, general-purpose asynchronous network in a control system is advantageous in economy and maintenance.

(2) Since a control system operates normally without securing strict real-time operation, the reliability of the control system against a network trouble can be increased.

(3) Since a controlled object process and a control apparatus can be connected to each other via a remote-type asynchronous network system such as public lines or the Internet, a manipulation station or an operation room can be installed at a place that is different from the site of a manufacturing plant or a factory. This makes it possible to install a petrochemical plant at an oil production site or in an oil production country and install an operation office including a control apparatus in a city or another country. By installing control stations for some factory in three countries whose standard times are shifted from each other by 8 hours and switching those control stations every 8 hours, the factory can be operated continuously for 24 hours without three shifts.

As described above, according to the invention, the degree of freedom of a plant operation form is increased, the total operation cost can be reduced, the plant operation can be made more efficient, and plant engineers, control engineers, and operation engineers can be allocated in a concentrated manner.

What is claimed is:

1. A network control system for transmitting signal between a control apparatus and a controlled object,
   said control apparatus comprising:
      a process signal receiving device for receiving a process signal outputted from the controlled object, the process signal includes a time information related to an observed process variable;
      a control variable calculating device for calculating a control variable for a process in the controlled object based on the process signal; and,
      a control signal outputting device for outputting a control signal including the calculated control variable and a detection time of the process variable to the controlled object; and
   said controlled object comprising:
      a control signal inputting device for receiving the control signal that is outputted from said control apparatus;
      a driver for driving a process of said controlled object based on the control variable included in the control signal;
      a detector for detecting the process variable of the process thus driven;
      a time measuring device for measuring a detection time of the process variable and reception time of the control signal; and
      a process signal outputting device for outputting the process signal including the detected process variable and the measured process variable detection time to said control apparatus, wherein
   said control signal inputting device further calculates a transmission delay that is a difference between the control signal reception time and the process variable detection time that is included in the control signal, corrects the control variable by processing in accordance with the transmission delay, and outputs a corrected control variable to said driver.

2. The network control system according to claim 1, wherein the control variable calculating device sets a plurality of assumed transmission delays and calculates optimum control variables for the respective assumed transmission delays, said control signal outputting device outputs the calculated control variables en bloc as the control signal, and said control signal receiving device selects one of the control variables included in the control signal corresponding to an assumed transmission delay that is closest to an actual transmission delay, and outputs a selected control variable to the driver as the corrected control variable.

3. The network control system according to claim 1, wherein said control variable calculating device calculates an optimum control variable response locus for a predetermined period from a present time, said control signal outputting device outputs the optimum control variable response locus in such a manner that it is included in the control signal, and said control signal inputting device stores the optimum control variable response locus included in the received control signal, and sequentially outputs, to said driver, values of the optimum control variable response locus as the corrected control variables in accordance with time that is measured by said time measuring device until reception of a next control signal.

4. The network control system according to claim 3, wherein the process signal outputting device combines a preceding control variable and preceding control signal reception time with the process variable and the process variable reception time to generate the process signal, and wherein the control variable calculating device comprises:

a model holding section for holding a model of said controlled object process and a network model in which a transmission delay is assumed;

a data buffer for storing process variable history data of past process variables and a process variable detection time points up to immediately before a present time and control variable history data of past control variables and control signal reception time points up to a preceding cycle;

a prediction calculation section for calculating a future process variable prediction response from the present time based on the models held by said model holding section and the process variable and control variable history data stored in said data buffer; and a control variable optimization section for determining a future optimum control variable response locus from the present time so that the process variable prediction response calculated by said prediction calculation section becomes as close to a preset target response locus as possible, and calculates, every time a new process signal is received, an optimum control variable response locus for a predetermined period from a present time by repeatedly performing calculations relating to the process.

5. The network control system according to claim 4, wherein:

a plurality of controlled objects connected to a single control apparatus bidirectionally like a star connection via individual network;

said control apparatus comprises process signal inputting device for inputting process signals from the controlled objects, control variable calculating device for calculating control signals for said respective controlled objects, and control signal outputting device for outputting the control signals to said respective control signal inputting device provided in said controlled objects via said networks;

said control signal calculating device comprises a prediction calculation section for calculating future process variable prediction responses from a present time based on models of respective processes in the controlled objects, mutual interference models each representing an influence of mutual interference between the processes, models of the asynchronous networks in which a transmission delay is assumed, and history data of past values of a plurality of process variables and a plurality of control variables up to the present time, and a control variable optimization section for determining future optimum control variable response loci from the present time so that the process variable prediction responses become as close to respective specified target response loci as possible, and calculates, every time a new process signal is received, an optimum control variable response locus for a predetermined period from a present time by repeatedly performing calculations relating to the process; and said control signal calculating device further calculates, every time a new process signal of any of the process variables is received, optimum control variable response loci for the respective control variables for a predetermined period from a present time by performing calculations of the above functions, and causes the control signal outputting device to output the optimum control variable response loci to said respective controlled objects.

6. The network control system according to claim 1 or 2, wherein:

said controlled object further comprises a transmission delay estimating device for estimating an average or a probability distribution function of past transmission delays up to a present time by measuring and storing the process variable detection time and the control variable reception time, and outputting the average transmission delay or the probability distribution function to the control signal receiving device and the process signal outputting device;

said control signal inputting device processes the received control signal by using the average transmission delay or the probability distribution function; and said control variable calculating device calculates the control variable in accordance with the average transmission delay or the probability distribution function that is included in the transmitted process signal.

7. A process management method for managing various processes in a controlled object, comprising the steps of:

calculating a control variable for execution of one of the processes in the controlled object in accordance with a control reference value and an actual process variable that was detected previously in the controlled object;

generating a control signal including the calculated control variable and process variable detection time that has been transmitted from the controlled object;

transmitting the control signal to the controlled object via an asynchronous network;

measuring reception time of the control signal in the controlled object;

calculating a transmission delay that is a difference between the control signal reception time and the process variable detection time;

correcting the control variable included in the control signal in accordance with the calculated transmission delay;

driving a driver in accordance with the corrected control variable, to thereby execute the process;

detecting a process variable of the process being executed and measuring detection time thereof; and generating a process signal including the detected process variable and the measured process variable detection time, and transmitting the process signal to the control apparatus via said network.

8. A recording medium on which a process management program for managing various processes in a controlled object of an network type control system is recorded, the process management program being for causing a computer to execute the steps of:

calculating a control variable for execution of one of the processes in the controlled object in accordance with a control reference value and an actual process variable that was detected previously in the controlled object;

generating a control signal including the calculated control variable and process variable detection time that has been transmitted from the controlled object;

transmitting the control signal to the controlled object via an asynchronous network;

measuring reception time of the control signal in the controlled object;

calculating a transmission delay that is a difference between the control signal reception time and the process variable detection time;

correcting the control variable included in the control signal in accordance with the calculated transmission delay;

driving a driver in accordance with the corrected control variable, to thereby execute the process;

detecting a process variable of the process being executed and measuring detection time thereof; and generating a process signal including the detected process variable and the measured process variable detection time, and transmitting the process signal to the control apparatus via the asynchronous network.

9. A network control system in which a controlled object and a control apparatus are connected to each other bidirectionally, wherein:

the controlled object comprises a process signal transmitting device, a control signal receiving device, and a timer for measuring transmission time and reception time;

the process signal transmitting device has a function of transmitting a process variable observation value and process variable transmission time information together;

the control apparatus has a function of transmitting process signal transmission time information and corresponding control signal together; and the control signal receiving device has means for calculating a transmission delay from the process signal transmission time and control signal reception time and processing the control signal based on the calculated transmission delay.

10. The network control system according to claim 9, wherein:

the control apparatus has a function of assuming a plurality of transmission delays, calculates optimum control variables for the respective assumed transmission delays, and transmitting the optimum control variables as a multiplexed control signal; and the control signal receiving device selects and uses one of the optimum control variables included in the multiplexed control signal that is most suitable for the calculated transmission delay.

11. The network control system according to claim 9, wherein the control apparatus has a function of calculating a series of future control variables for a predetermined period from a present time and transmitting the series of control variables as a multiplexed control signal, and the control signal receiving device sequentially selects control variables from the series of control variables included in the multiplexed control signal and uses the selected control variables.

12. A network control system for transmitting signal between a control apparatus and a controlled object, comprising:

a process signal outputting device connected to said controlled object, for outputting an observed process variable and an output time information;

a control signal outputting device connected to said control apparatus, for outputting a control variable taking account of the observed process variable and the output time information; and, a process signal inputting device connected to said controlled object, for calculating delay time of the output time information from said control signal outputting device to said process signal inputting device, and re-calculating the process variable taking account of the calculating delay time.

13. The network control system according to claim 12, wherein said control signal outputting device outputs a plurality of estimated control variables, and said process signal inputting device selects an optimum value from the estimated control variables by consideration of the delay time.

14. The network control system according to claim 12, wherein said control signal outputting device outputs a series of estimated control variables in time order, and said process signal inputting device utilizes the series of estimated control variables until when a new series of estimated control variables is inputted.

* * * * *